United States Patent
Xu et al.

(10) Patent No.: US 11,252,129 B2
(45) Date of Patent: Feb. 15, 2022

(54) PACKET TRANSMISSION METHOD AND APPARATUS

(71) Applicant: HUAWEI TECHNOLOGIES CO., LTD., Shenzhen (CN)

(72) Inventors: Weiping Xu, Dongguan (CN); Hua Long, Dongguan (CN); Hongwei He, Nanjing (CN); Shucheng Liu, Dongguan (CN); Yuanlong Jiang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/581,826

(22) Filed: Sep. 25, 2019

(65) Prior Publication Data

US 2020/0021558 A1 Jan. 16, 2020

Related U.S. Application Data

(63) Continuation of application No. PCT/CN2018/081323, filed on Mar. 30, 2018.

(30) Foreign Application Priority Data

Mar. 30, 2017 (CN) .......................... 201710201924.1

(51) Int. Cl.
*H04L 29/12* (2006.01)
*H04L 12/46* (2006.01)
*H04L 12/721* (2013.01)

(52) U.S. Cl.
CPC ...... *H04L 61/2592* (2013.01); *H04L 12/4633* (2013.01); *H04L 12/4679* (2013.01); *H04L 45/66* (2013.01)

(58) Field of Classification Search
None
See application file for complete search history.

(56) References Cited

U.S. PATENT DOCUMENTS

2008/0126528 A1* 5/2008 Takeda ................ H04L 61/2575
709/223
2012/0281707 A1 11/2012 Muhanna et al.
(Continued)

FOREIGN PATENT DOCUMENTS

CN 103688516 A 3/2014
CN 104601432 A 5/2015
(Continued)

OTHER PUBLICATIONS

Rosenberg et al., "STUN—Simple Traversal of User Datagram Protocol (UDP) Through Network Address Translators (NATs)", Network Working Group Request for Comments: 3489, Mar. 2003, total 47 pages.
(Continued)

*Primary Examiner* — James A Edwards
(74) *Attorney, Agent, or Firm* — Maier & Maier, PLLC

(57) ABSTRACT

An embodiment provides a packet transmission method and apparatus, to resolve a problem that occurs when a packet cannot traverse a NAT device when VTEPs communicate with each other through the NAT device. The method is applied to a VXLAN including a first VTEP, a second VTEP, and a NAT device. The method includes: performing, by the first VTEP, VXLAN encapsulation on a first packet, obtaining a second packet; sending, by the first VTEP, the second packet to the second VTEP through the NAT device; and performing, by the second VTEP, VXLAN decapsulation on the received second packet, to obtain the first packet. The first packet is a packet to be sent by the first VTEP, a destination port number of the second packet is obtained
(Continued)

based on a destination IP address of the second packet, and a source port number of the second packet is a preset port number.

17 Claims, 12 Drawing Sheets

(56) References Cited

U.S. PATENT DOCUMENTS

| | | | |
|---|---|---|---|
| 2014/0112137 A1 | 4/2014 | Schlansker et al. | |
| 2014/0325637 A1* | 10/2014 | Zhang | H04L 61/2535 726/15 |
| 2016/0094365 A1* | 3/2016 | Subramaniyam | H04L 12/4641 370/401 |
| 2018/0167320 A1* | 6/2018 | Huang | H04L 61/2592 |
| 2018/0205623 A1* | 7/2018 | Gao | H04L 63/0272 |

FOREIGN PATENT DOCUMENTS

| | | |
|---|---|---|
| CN | 105721359 A | 6/2016 |
| CN | 106330649 A | 1/2017 |
| WO | 2016/202269 A2 | 12/2016 |

OTHER PUBLICATIONS

Minghao, "Design and Implementation of the VXLAN Tunnel", Harbin Institute of Technology, Jun. 2014, total 85 pages.

Mahalingam et al., "Virtual extensible Local Area Network (VXLAN): A Framework for Overlaying Virtualized Layer 2 Networks over Layer 3 Networks", Independent Submission Request for Comments: 7348, Aug. 2014, total 22 pages.

* cited by examiner

PACKET TRANSMISSION METHOD AND APPARATUS

CROSS-REFERENCE TO RELATED APPLICATIONS

This application is a continuation of International Application No. PCT/CN2018/081323, filed on Mar. 30, 2018, which claims priority to Chinese Patent Application No. 201710201924.1, filed on Mar. 30, 2017. The disclosures of the aforementioned applications are hereby incorporated by reference in their entireties.

FIELD

Embodiments relate to the field of communications technologies, and in particular, to a packet transmission method and apparatus.

BACKGROUND

With the development of Internet technologies, both NAT (network address translation) and VXLAN (Virtual Extensible LAN, virtual extensible local area network) technologies are widely applied. A VTEP (VXLAN tunnel end point) is used to encapsulate/decapsulate a VXLAN packet.

When the VTEP encapsulates a to-be-sent packet, a source port number of an encapsulated packet is a port number that is randomly obtained or is obtained by using a hash algorithm, and a destination port number is a preset port number 4789. Because the foregoing VXLAN packet sending mechanism is used, when two VTEPs are respectively located on a private network side and a public network side, if a NAT device is deployed in an operator network, a problem occurs where a packet is blocked or discarded when the two VTEPs send packets through the NAT device.

FIG. 1 is used as an example. FIG. 1 is a schematic diagram showing that a VTEP B located on a private network side and a VTEP A located on a public network side communicate with each other through a NAT device. VTEP B sends an encapsulated packet A to VTEP A, where a source IP (Internet Protocol) address of packet A is IP1, a destination IP address of packet A is IP2, a source port number of packet A is port, and a destination port number of packet A is 4789. When packet A passes through the NAT device, the NAT device translates the source IP address of packet A from IP1 to IP11, translates the source port number of packet A from port1 to port11, then sends packet A to VTEP A, and records a translation relationship: IP1 ↔ IP11 and port1 ↔ port11, in a NAT entry. When VTEP B sends an encapsulated packet B to the VTEP A, a source port number of packet B is port3, and a destination port number is 4789. After packet B is sent to the NAT device, because the NAT entry records no entry corresponding to the destination port number 4789, and the source port number port3 does not match the destination port number 4789 of packet A sent by VTEP B to VTEP A, packet B is blocked or discarded in the NAT device, in other words, the packet cannot traverse the NAT device.

In conclusion, in the prior art, if the VTEPs communicate with each other through the NAT device, there is a problem because the packet cannot traverse the NAT device.

SUMMARY

Embodiments herein provide a packet transmission method and apparatus, to resolve a problem where a packet cannot traverse a NAT device when VTEPs communicate with each other through the NAT device.

According to a first aspect, a packet transmission method may be provided. The method is applied to a VXLAN, the VXLAN includes a first VTEP, a second VTEP, and a NAT device. The first VTEP communicates with the second VTEP through the NAT device. The first VTEP is located in a public network, and the second VTEP is located in a private network. The method includes the following steps: performing, by the first VTEP, VXLAN encapsulation on a first packet, to obtain a second packet; and then sending, by the first VTEP, the second packet to the second VTEP through the NAT device.

The first packet is a to-be-sent packet, a destination port number of the second packet is obtained based on a destination IP address of the second packet, and a source port number of the second packet is a preset port number.

In the packet transmission method provided in the first aspect, the first VTEP located in the public network sends the second packet to the second VTEP located in the private network, the destination port number of the second packet is obtained based on the destination IP address of the second packet, and the source port number is the preset port number. When the NAT device receives the second packet, because the source port number (preset port number) of the second packet can match a preset port number in a NAT entry, and the destination port number of the second packet is obtained based on the destination IP address of the second packet, the destination IP address of the second packet can match the NAT entry in the NAT device, and the destination port number of the second packet can correspondingly match the NAT entry in the NAT device. Therefore, in the packet transmission method provided in the first aspect, when the first VTEP and the second VTEP communicate with each other through the NAT device, a problem in the prior art where a packet cannot traverse a NAT device does not occur. In the packet transmission method provided in the first aspect, the packet can be transmitted between the first VTEP located in the public network and the second VTEP located in the private network.

Based on the first aspect, in a possible implementation, the destination port number of the second packet is determined based on the destination IP address of the second packet and a first mapping relationship, and the first mapping relationship is used to indicate a mapping relationship between a source IP address and a source port number of a packet received by the first VTEP from the second VTEP through the NAT device.

An exemplary manner for obtaining the first mapping relationship may be as follows: before the first VTEP performs VXLAN encapsulation on the first packet, the first VTEP receives a third packet sent by the second VTEP through the NAT device, and the first VTEP generates or updates the first mapping relationship based on a mapping relationship between a source IP address and a source port number of the third packet.

It should be noted that, the type of the third packet is not limited in this embodiment. Provided that the second VTEP sends a packet to the first VTEP through the NAT device, and a source port number and a destination port number of the packet are preset port numbers, the packet may be the third packet.

The second VTEP sends the third packet to the first VTEP, so that the first VTEP can generate or update the first mapping relationship based on the mapping relationship between the source IP address and the source port number of the third packet. Therefore, a manner of generating or updating the first mapping relationship is provided.

Based on the first aspect, in a possible implementation, before the first VTEP performs VXLAN encapsulation on the first packet, the first VTEP may obtain the destination IP address of the second packet based on a destination MAC address of the first packet and a second mapping relationship, where the second mapping relationship is used to indicate a mapping relationship between a VXLAN-decapsulated source MAC address and the source IP address of the packet received by the first VTEP from the second VTEP through the NAT device.

After receiving the third packet, the first VTEP may generate or update the second mapping relationship based on a mapping relationship between a VXLAN-decapsulated source MAC address and the source IP address of the third packet.

In the foregoing solution, an exemplary embodiment for obtaining the destination IP address of the second packet is provided.

Based on the first aspect, in a possible implementation, before the first VTEP performs VXLAN encapsulation on the first packet, the first VTEP may receive a detection packet sent by the second VTEP, where the detection packet carries detection information, and the detection information is used to detect whether the first VTEP and the second VTEP communicate with each other through the NAT device; and the first VTEP determines, based on the detection information, that the first VTEP and the second VTEP communicate with each other through the NAT device.

The detection information includes one or more of the following information: a private network source IP address of the detection packet, a private network source port number of the detection packet, and a first calculation result obtained through calculation based on the private network source IP address and the private network source port number.

It should be noted that, the detection packet may carry a second identifier. The second identifier may be used to indicate that the detection packet is a packet used by the first VTEP to detect whether the first VTEP and the second VTEP communicate with each other through the NAT device. In this case, after receiving the detection packet, the first VTEP can determine, based on the second identifier, that the detection packet is the packet used by the first VTEP to detect whether the first VTEP and the second VTEP communicate with each other through the NAT device. Therefore, the first VTEP does not process a payload in the detection packet, and only needs to determine whether the first VTEP and the second VTEP communicate with each other through the NAT device. The detection packet carries the second identifier, so that the system resource occupation caused when the second VTEP performs useless processing on the payload in the detection packet can be avoided.

In the foregoing exemplary embodiments, the first VTEP can determine, based on the detection information included in the detection packet, that the first VTEP and the second VTEP communicate with each other through the NAT device.

Based on the first aspect, in a possible implementation, the manner in which the first VTEP determines, based on the detection information, that the first VTEP and the second VTEP communicate with each other through the NAT device includes, but is not limited, to the following three embodiments:

In a first manner:
When determining, through comparison, that the private network source IP address of the detection packet is different from a source IP address of the detection packet, the first VTEP determines that the first VTEP and the second VTEP communicate with each other through the NAT device.

In a second manner:
When determining, through comparison, that the private network source port number of the detection packet is different from a source port number of the detection packet, the first VTEP determines that the first VTEP and the second VTEP communicate with each other through the NAT device.

In a third manner:
The first VTEP calculates the source IP address of the detection packet and the source port number of the detection packet to obtain a second calculation result, and when the second calculation result is different from the first calculation result, determines that the first VTEP and the second VTEP communicate with each other through the NAT device.

The first manner is used as an example below to describe a principle of determining, by the first VTEP based on the detection information, that the first VTEP and the second VTEP communicate with each other through the NAT device. When the detection information includes the private network source IP address of the detection packet, and the first VTEP determines, through comparison, that the private network source IP address of the detection packet is different from the source IP address of the detection packet, the first VTEP determines that the first VTEP and the second VTEP communicate with each other through the NAT device. This is because if the first VTEP and the second VTEP communicate with each other through the NAT device, the NAT device translates the private network source IP address of the detection packet into a public network IP address. The first VTEP compares the private network source IP address of the detection packet with the source IP address of the detection packet. If the private network source IP address of the detection packet is different from the source IP address of the detection packet, it indicates that the source IP address of the detection packet is the public network IP address obtained through translation by the NAT device, in other words, indicates that the first VTEP and the second VTEP communicate with each other through the NAT device. The manner in which the first VTEP determines, based on the private network source port number of the detection packet carried in the detection information or the first calculation result, that the first VTEP and the second VTEP communicate with each other through the NAT device is similar to the principle in the foregoing example, and details are not described herein again.

Based on the first aspect, in a possible implementation, before the first VTEP performs VXLAN encapsulation on the first packet, the first VTEP may receive a control message sent by an SDN (software-defined networking) controller, where the control message is used to indicate that the first VTEP and the second VTEP communicate with each other through the NAT device.

In the foregoing solution, the first VTEP does not need to determine that the first VTEP and the second VTEP communicate with each other through the NAT device, but the SDN controller determines that the first VTEP and the second VTEP communicate with each other through the NAT device, and notifies the first VTEP of this information using the control message.

Based on the first aspect, in a possible implementation, the first VTEP may receive a fourth packet sent by the second VTEP through the NAT device, where the fourth packet is used by the NAT device to generate or update a NAT entry of the NAT device.

In the NAT device, the NAT entry has an aging cycle. In other words, if the NAT device does not receive, within a specific time, a packet matching the NAT entry, the NAT entry becomes invalid. Therefore, in the foregoing solution, the second VTEP sends the fourth packet to the first VTEP through the NAT device, and the NAT device may update the NAT entry based on the fourth packet, so as to avoid NAT entry invalidation caused when the NAT device does not receive, within a specific time, a packet matching the NAT entry.

In addition, the fourth packet may carry a first identifier used to indicate a packet type of the fourth packet. After receiving the fourth packet, the first VTEP may determine, based on the first identifier, that the fourth packet is a packet used to generate or update the NAT entry. Therefore, no processing is performed on a payload in the fourth packet, thereby avoiding system resource occupation.

According to a second aspect, a packet transmission method is provided. The method is applied to a VXLAN. The VXLAN includes a first VTEP, a second VTEP, and a NAT device. The first VTEP communicates with the second VTEP through the NAT device, the first VTEP is located in a public network, and the second VTEP is located in a private network. The method includes the following steps: receiving, by the second VTEP, a second packet sent by the first VTEP through the NAT device; and performing, by the second VTEP, VXLAN decapsulation on the second packet, to obtain a first packet. Both a source port number and a destination port number of the second packet are preset port numbers. Before the NAT device translates the destination port number and a destination IP address of the second packet, the destination port number of the second packet is obtained by the first VTEP based on the destination IP address of the second packet.

In the packet transmission method provided in the second aspect, because the NAT device translates the destination port number of the second packet sent by the first VTEP to the second VTEP, the destination port number (preset port number) of the second packet received by the second VTEP is different from the destination port number of the second packet sent by the first VTEP. In other words, the destination port number (preset port number) of the second packet is a port number obtained after the NAT device performs matching on a NAT entry. Because a mapping relationship between the preset port number and a public network port number exists in the NAT device, the destination port number of the second packet sent by the first VTEP to the second VTEP can match the NAT entry. Therefore, in the packet transmission method provided in the second aspect, when the first VTEP and the second VTEP communicate with each other through the NAT device, a problem in the prior art where a packet cannot traverse a NAT device does not occur. In the packet transmission method provided in the second aspect, the packet can be transmitted between the first VTEP located in the public network and the second VTEP located in the private network.

In addition, when the second VTEP receives the second packet whose destination port number is the preset port number, the second VTEP may learn that the second packet is a packet of a VXLAN type, and perform VXLAN decapsulation on the second packet to obtain the first packet.

Based on the second aspect, in a possible implementation, before the second VTEP receives the second packet sent by the first VTEP through the NAT device, the second VTEP may send a third packet to the first VTEP through the NAT device, where a source port number and a destination port number of the third packet are the preset port numbers, the third packet is used by the first VTEP to generate or update a first mapping relationship, and the first mapping relationship is used to indicate a mapping relationship between a source IP address and a source port number of a packet received by the first VTEP from the second VTEP through the NAT device.

The second VTEP sends the third packet to the first VTEP, so that the first VTEP can generate or update the first mapping relationship based on the mapping relationship between the source IP address and the source port number of the third packet. Therefore, a manner for generating or updating the first mapping relationship is provided. The first mapping relationship may be used by the first VTEP to determine the destination port number (public network port number) of the second packet that is to be sent by the first VTEP.

Based on the second aspect, in a possible implementation, before the second VTEP receives the second packet sent by the first VTEP through the NAT device, the second VTEP may send a detection packet to the first VTEP, where the detection packet carries detection information, the detection information is used by the first VTEP to detect whether the first VTEP and the second VTEP communicate with each other through the NAT device, and both a source port number and a destination port number of the detection packet are the preset port numbers.

The detection information includes one or more of the following information: a private network source IP address of the detection packet, a private network source port number of the detection packet, and a first calculation result obtained through calculation based on the private network source IP address and the private network source port number.

In the foregoing solution, the first VTEP can determine, based on the detection information included in the detection packet, that the first VTEP and the second VTEP communicate with each other through the NAT device.

Based on the second aspect, in a possible implementation, before the second VTEP receives the second packet sent by the first VTEP through the NAT device, the second VTEP may send a registration request message to an SDN controller, where the registration request message carries detection information, and the detection information is used by the SDN controller to detect whether the first VTEP and the second VTEP communicate with each other through the NAT device.

The detection information includes one or more of the following information: a private network source IP address of the detection packet, a private network source port number of the detection packet, and a first calculation result obtained through calculation based on the private network source IP address and the private network source port number.

In the foregoing solution, the first VTEP does not need to determine that the first VTEP and the second VTEP communicate with each other through the NAT device, but the SDN controller determines, based on the detection information carried in the registration request message sent by the second VTEP, that the first VTEP and the second VTEP communicate with each other through the NAT device.

Based on the second aspect, in a possible implementation, the second VTEP may send a fourth packet to the first VTEP through the NAT device, where the fourth packet is used by the NAT device to generate or update a NAT entry of the NAT device, and both a source port number and a destination port number of the fourth packet are the preset port numbers.

In the NAT device, the NAT entry has an aging cycle. In other words, if the NAT device does not receive, within a specific time, a packet matching the NAT entry, the NAT entry becomes invalid. Therefore, in the foregoing solution, the second VTEP sends the fourth packet to the first VTEP through the NAT device, and the NAT device may update the NAT entry based on the fourth packet, so as to avoid NAT entry invalidation caused when the NAT device does not receive, within a specific time, a packet matching the NAT entry.

In addition, the fourth packet may carry a first identifier used to indicate a packet type of the fourth packet. After receiving the fourth packet, the first VTEP may determine, based on the first identifier, that the fourth packet is a packet used to generate or update the NAT entry. Therefore, no processing is performed on a payload in the fourth packet, thereby reducing system resource occupation.

According to a third aspect, a packet transmission method is provided. The method is applied to a VXLAN. The VXLAN includes a first VTEP, a second VTEP, and a NAT device. The first VTEP communicates with the second VTEP through the NAT device, the first VTEP is located in a public network, and the second VTEP is located in a private network. The method includes the following steps: performing, by the second VTEP, VXLAN encapsulation on a fifth packet, to obtain a fourth packet, where the fifth packet is an original packet to be sent by the second VTEP, both a source port number and a destination port number of the fourth packet are preset port numbers, the fourth packet is used by the NAT device to generate or update a NAT entry of the NAT device and is used by the first VTEP to generate or update a mapping relationship, and when the first VTEP sends a VXLAN-encapsulated packet to the second VTEP through the NAT device, the mapping relationship is used by the first VTEP to determine a destination port number and/or a destination IP address of the packet; and sending, by the second VTEP, the fourth packet to the first VTEP through the NAT device.

The VXLAN-encapsulated packet is a packet on which VXLAN encapsulation is performed. For example, the second packet, the third packet, the fourth packet, the detection packet, and the like are all VXLAN-encapsulated packets. The first packet and the fifth packet are packets on which no VXLAN encapsulation is performed. The second packet obtained after VXLAN encapsulation is performed on the first packet is a VXLAN-encapsulated packet, and the fourth packet obtained after VXLAN encapsulation is performed on the fifth packet is also a VXLAN-encapsulated packet.

In the NAT device, the NAT entry has an aging cycle. In other words, if the NAT device does not receive, within a specific time, a packet matching the NAT entry, the NAT entry becomes invalid. Therefore, in the method provided in the third aspect, the second VTEP sends the fourth packet to the first VTEP through the NAT device, and the NAT device may update the NAT entry based on the fourth packet, so as to avoid NAT entry invalidation caused when the NAT device does not receive, within a specific time, a packet matching the NAT entry.

In addition, the fourth packet may be further used by the first VTEP to generate or update the mapping relationship, and the first VTEP may determine, based on the mapping relationship, the destination port number and/or the destination IP address of the packet sent to the second VTEP through the NAT device. The mapping relationship may be the first mapping relationship or the second mapping relationship in the method provided in the first aspect or the method provided in the second aspect.

Based on the third aspect, in a possible implementation, the sending, by the second VTEP, the fourth packet to the first VTEP through the NAT device includes: periodically sending, by the second VTEP, the fourth packet to the first VTEP through the NAT device.

According to a fourth aspect, a packet transmission method is provided. The method is applied to a VXLAN. The VXLAN includes a first VTEP, a second VTEP, and a NAT device. The first VTEP communicates with the second VTEP through the NAT device, the first VTEP is located in a public network, and the second VTEP is located in a private network. The method includes the following steps: receiving, by the first VTEP, a fourth packet sent by the second VTEP through the NAT device, where the fourth packet is used by the NAT device to generate or update a NAT entry of the NAT device and is used by the first VTEP to generate or update a mapping relationship, and when the first VTEP sends a VXLAN-encapsulated packet to the second VTEP through the NAT device, the mapping relationship is used by the first VTEP to determine a destination port number and/or a destination IP address of the packet; and generating or updating, by the first VTEP, the mapping relationship based on the fourth packet.

The mapping relationship may be the first mapping relationship or the second mapping relationship in the method provided in the first aspect or the method provided in the second aspect.

The VXLAN-encapsulated packet is a packet on which VXLAN encapsulation is performed. For example, the second packet, the third packet, the fourth packet, the detection packet, and the like are all VXLAN-encapsulated packets. The first packet and the fifth packet are packets on which no VXLAN encapsulation is performed. The second packet obtained after VXLAN encapsulation is performed on the first packet is a VXLAN-encapsulated packet, and the fourth packet obtained after VXLAN encapsulation is performed on the fifth packet is also a VXLAN-encapsulated packet.

In the NAT device, the NAT entry has an aging cycle. In other words, if the NAT device does not receive, within a specific time, a packet matching the NAT entry, the NAT entry becomes invalid. Therefore, in the method provided in the fourth aspect, the second VTEP sends the fourth packet to the first VTEP through the NAT device, and the NAT device may update the NAT entry based on the fourth packet, so as to avoid NAT entry invalidation caused when the NAT device does not receive, within a specific time, a packet matching the NAT entry.

Based on the fourth aspect, in a possible implementation, the receiving, by the first VTEP, a fourth packet sent by the second VTEP through the NAT device includes: periodically receiving, by the first VTEP, the fourth packet sent by the second VTEP through the NAT device.

Based on the fourth aspect, in a possible implementation, after the first VTEP generates or updates the mapping relationship based on the fourth packet, the first VTEP may send a second packet to the second VTEP through the NAT device, where a destination port number of the second packet is obtained based on the mapping relationship, and a source port number of the second packet is a preset port number.

According to a fifth aspect, a packet transmission apparatus is provided. The apparatus is applied to a VXLAN, the VXLAN includes the apparatus, a second VTEP, and a NAT device, the apparatus communicates with the second VTEP through the NAT device, the apparatus is located in a public network, and the second VTEP is located in a private network. The apparatus includes: a processing module, configured to perform VXLAN encapsulation on a first packet, to obtain a second packet; and a transceiver module, configured to send the second packet to the second VTEP through the NAT device. The first packet is a to-be-sent packet, a destination port number of the second packet is obtained based on a destination IP address of the second packet, and a source port number of the second packet is a preset port number.

Based on the fifth aspect, in a possible implementation, the destination port number of the second packet is obtained based on the destination IP address of the second packet and a first mapping relationship, and the first mapping relationship is used to indicate a mapping relationship between a source IP address and a source port number of a packet received by the transceiver module from the second VTEP through the NAT device.

Based on the fifth aspect, in a possible implementation, the transceiver module is further configured to: before the processing module performs VXLAN encapsulation on the first packet, receive a third packet sent by the second VTEP through the NAT device; and the processing module is further configured to generate or update the first mapping relationship based on a mapping relationship between a source IP address and a source port number of the third packet.

Based on the fifth aspect, in a possible implementation, the processing module is further configured to: before performing VXLAN encapsulation on the first packet, obtain the destination IP address of the second packet based on a destination MAC address of the first packet and a second mapping relationship, where the second mapping relationship is used to indicate a mapping relationship between a VXLAN-decapsulated source MAC address and the source IP address of the packet received by the transceiver module from the second VTEP through the NAT device.

Based on the fifth aspect, in a possible implementation, the transceiver module is further configured to: before the processing module performs VXLAN encapsulation on the first packet, receive a detection packet sent by the second VTEP, where the detection packet carries detection information, and the detection information is used to detect whether the apparatus and the second VTEP communicate with each other through the NAT device; and the processing module is further configured to determine, based on the detection information, that the apparatus and the second VTEP communicate with each other through the NAT device.

The detection information includes one or more of the following information: a private network source IP address of the detection packet, a private network source port number of the detection packet, and a first calculation result obtained through calculation based on the private network source IP address and the private network source port number.

Based on the fifth aspect, in a possible implementation, a determining manner in which the processing module determines, based on the detection information, that the apparatus and the second VTEP communicate with each other through the NAT device includes but is not limited to the following three manners:

In the first manner:

When determining, through comparison, that the private network source IP address of the detection packet is different from a source IP address of the detection packet, the processing module determines that the apparatus and the second VTEP communicate with each other through the NAT device.

In the second manner:

When determining, through comparison, that the private network source port number of the detection packet is different from a source port number of the detection packet, the processing module determines that the apparatus and the second VTEP communicate with each other through the NAT device.

In the third manner:

The processing module calculates the source IP address of the detection packet and the source port number of the detection packet to obtain a second calculation result, and when the second calculation result is different from the first calculation result, determines that the apparatus and the second VTEP communicate with each other through the NAT device.

Based on the fifth aspect, in a possible implementation, the transceiver module is further configured to: before the processing module performs VXLAN encapsulation on the first packet, receive a control message sent by an SDN controller, where the control message is used to indicate that the apparatus and the second VTEP communicate with each other through the NAT device.

Based on the fifth aspect, in a possible implementation, the transceiver module is further configured to receive a fourth packet sent by the second VTEP through the NAT device, where the fourth packet is used by the NAT device to generate or update a NAT entry of the NAT device.

Based on the fifth aspect, in a possible implementation, the fourth packet carries a first identifier, and the first identifier is used to indicate a packet type of the fourth packet.

It should be noted that, the packet transmission apparatus provided in the fifth aspect may be configured to perform the packet transmission method according to the first aspect. For an implementation and a technical effect that are not described in detail in the packet transmission apparatus provided in the fifth aspect, refer to related descriptions in the packet transmission method according to the first aspect.

According to a sixth aspect, a packet transmission apparatus is provided. The apparatus is applied to a VXLAN, the VXLAN includes a first VTEP, the apparatus, and a NAT device, the first VTEP communicates with the apparatus through the NAT device, the first VTEP is located in a public network, and the apparatus is located in a private network. The apparatus includes: a transceiver module, configured to receive a second packet sent by the first VTEP through the NAT device, where both a source port number and a destination port number of the second packet are preset port numbers, and the destination port number of the second packet is obtained by the first VTEP based on a destination IP address of the second packet before the second packet is sent through the NAT device; and a processing module, configured to perform VXLAN decapsulation on the second packet, to obtain a first packet.

Based on the sixth aspect, in a possible implementation, the transceiver module is further configured to: before receiving the second packet sent by the first VTEP through the NAT device, send a third packet to the first VTEP through the NAT device. Both a source port number and a destination port number of the third packet are the preset port numbers, the third packet is used by the first VTEP to generate or update a first mapping relationship, and the first mapping relationship is used to indicate a mapping relationship between a source IP address and a source port number of a packet received by the first VTEP from the apparatus through the NAT device.

Based on the sixth aspect, in a possible implementation, the transceiver module is further configured to: before receiving the second packet sent by the first VTEP through the NAT device, send a detection packet to the first VTEP. The detection packet carries detection information, the detection information is used by the first VTEP to detect whether the first VTEP and the apparatus communicate with each other through the NAT device, and both a source port number and a destination port number of the detection packet are the preset port numbers.

The detection information includes one or more of the following information: a private network source IP address of the detection packet, a private network source port number of the detection packet, and a first calculation result obtained through calculation based on the private network source IP address and the private network source port number.

Based on the sixth aspect, in a possible implementation, the transceiver module is further configured to: before receiving the second packet sent by the first VTEP through the NAT device, send a registration request message to an SDN controller, where the registration request message carries detection information, and the detection information is used by the SDN controller to detect whether the first VTEP and the apparatus communicate with each other through the NAT device.

The detection information includes one or more of the following information: a private network source IP address of the detection packet, a private network source port number of the detection packet, and a first calculation result obtained through calculation based on the private network source IP address and the private network source port number.

Based on the sixth aspect, in a possible implementation, the transceiver module is further configured to send a fourth packet to the first VTEP through the NAT device. The fourth packet is used by the NAT device to generate or update a NAT entry of the NAT device, and both a source port number and a destination port number of the fourth packet are the preset port numbers.

Based on the sixth aspect, in a possible implementation, the fourth packet carries a first identifier, and the first identifier is used to indicate a packet type of the fourth packet.

It should be noted that, the packet transmission apparatus provided in the sixth aspect may be configured to perform the packet transmission method according to the second aspect. The implementation and technical effect are not described in detail in the packet transmission apparatus provided in the sixth aspect; refer to related descriptions in the packet transmission method according to the second aspect.

According to a seventh aspect, a packet transmission apparatus is provided. The apparatus is applied to a VXLAN, the VXLAN includes a first VTEP, the apparatus, and a NAT device, the first VTEP communicates with the apparatus through the NAT device, the first VTEP is located in a public network, and the apparatus is located in a private network. The apparatus includes: a processing module, configured to perform VXLAN encapsulation on a fifth packet, to obtain a fourth packet, where the fifth packet is an original to-be-sent packet, both a source port number and a destination port number of the fourth packet are preset port numbers, the fourth packet is used by the NAT device to generate or update a NAT entry of the NAT device and is used by the first VTEP to generate or update a mapping relationship, and when the first VTEP sends a VXLAN-encapsulated packet to the apparatus through the NAT device, the mapping relationship is used by the first VTEP to determine a destination port number and/or a destination IP address of the packet; and a transceiver module, configured to send the fourth packet to the first VTEP through the NAT device.

Based on the seventh aspect, in a possible implementation, when the transceiver module sends the fourth packet to the first VTEP through the NAT device, the transceiver module is configured to periodically send the fourth packet to the first VTEP through the NAT device.

It should be noted that, the packet transmission apparatus provided in the seventh aspect may be configured to perform the packet transmission method according to the third aspect. For an implementation and a technical effect that are not described in detail in the packet transmission apparatus provided in the seventh aspect, refer to related descriptions in the packet transmission method according to the third aspect.

According to an eighth aspect, a packet transmission apparatus is provided. The apparatus is applied to a VXLAN, the VXLAN includes the apparatus, a second VTEP, and a NAT device, the apparatus communicates with the second VTEP through the NAT device, the apparatus is located in a public network, and the second VTEP is located in a private network. The apparatus includes: a transceiver module, configured to receive a fourth packet sent by the second VTEP through the NAT device, where the second VTEP is located in the private network, the fourth packet is used by the NAT device to generate or update a NAT entry of the NAT device and is used by the apparatus to generate or update a mapping relationship, and when the apparatus sends a VXLAN-encapsulated packet to the second VTEP through the NAT device, the mapping relationship is used by the apparatus to determine a destination port number and/or a destination IP address of the packet; and a processing module, configured to generate or update the mapping relationship based on the fourth packet.

Based on the eighth aspect, in a possible implementation, when the transceiver module receives the fourth packet sent by the second VTEP through the NAT device, the transceiver module is configured to periodically receive the fourth packet sent by the second VTEP through the NAT device.

Based on the eighth aspect, in a possible implementation, after the processing module generates or updates the mapping relationship based on the fourth packet, the transceiver module sends a second packet to the second VTEP through the NAT device, where a destination port number of the second packet is obtained based on the mapping relationship, and a source port number of the second packet is a preset port number.

It should be noted that, the packet transmission apparatus provided in the eighth aspect may be configured to perform the packet transmission method according to the fourth aspect. For an implementation and a technical effect that are not described in detail in the packet transmission apparatus provided in the eighth aspect, refer to related descriptions in the packet transmission method according to the fourth aspect.

According to a ninth aspect, a packet transmission apparatus is provided. The apparatus is applied to a VXLAN, the VXLAN includes the apparatus, a second VTEP, and a NAT device, the apparatus communicates with the second VTEP through the NAT device, the apparatus is located in a public network, and the second VTEP is located in a private network. The apparatus includes: a processor, configured to perform VXLAN encapsulation on a first packet, to obtain a second packet, where the first packet is a to-be-sent packet, a destination port number of the second packet is obtained based on a destination IP address of the second packet, and a source port number of the second packet is a preset port number; and a transceiver, configured to send the second packet to the second VTEP through the NAT device.

It should be noted that, the packet transmission apparatus provided in the ninth aspect may be configured to perform the packet transmission methods provided in the first aspect and the fourth aspect, and the packet transmission apparatus provided in the ninth aspect may be the same apparatus as the packet transmission apparatuses provided in the fifth aspect and the eighth aspect.

According to a tenth aspect, a packet transmission apparatus is provided. The apparatus is applied to a VXLAN, the VXLAN includes a first VTEP, the apparatus, and a NAT device, the first VTEP communicates with the apparatus through the NAT device, the first VTEP is located in a public network, and the apparatus is located in a private network. The apparatus includes:

a transceiver, configured to receive a second packet sent by the first VTEP through the NAT device, where both a source port number and a destination port number of the second packet are preset port numbers, and the destination port number of the second packet is obtained by the first VTEP based on a destination IP address of the second packet before the second packet is sent through the NAT device; and a processor, configured to perform VXLAN decapsulation on the second packet, to obtain a first packet.

It should be noted that, the packet transmission apparatus provided in the tenth aspect may be configured to perform the packet transmission methods provided in the second aspect and the third aspect, and the packet transmission apparatus provided in the tenth aspect may be the same apparatus as the packet transmission apparatuses provided in the sixth aspect and the seventh aspect.

According to an eleventh aspect, a computer readable storage medium is provided. The computer readable storage medium stores a computer executable instruction. When at least one processor of a computing node executes the computer executable instruction, the computing node performs the method provided in the first aspect or the possible implementations of the first aspect, the method provided in the second aspect or the possible implementations of the second aspect, the method provided in the third aspect or the possible implementations of the third aspect, or the method provided in the fourth aspect or the possible implementations of the fourth aspect.

According to a twelfth aspect, a computer program product is provided. The computer program product includes a computer executable instruction, and the computer executable instruction is stored in a computer readable storage medium. At least one processor of a computing node may read the computer executable instruction from the computer readable storage medium, and the at least one processor executes the computer executable instruction, so that the computing node performs the method provided in the first aspect or the possible implementations of the first aspect, the method provided in the second aspect or the possible implementations of the second aspect, the method provided in the third aspect or the possible implementations of the third aspect, or the method provided in the fourth aspect or the possible implementations of the fourth aspect.

DESCRIPTION OF EMBODIMENTS

NAT is a translation technology for translating an IP address in a private network (referred to as a private network IP address) into an IP address in a public network (referred to as a public network IP address). NAT is mainly used for accessing a public network through a private network. When a small quantity of public network IP addresses are used, users corresponding to a relatively large quantity of private network IP addresses can access a network through NAT. NAT not only resolves the problem of IP address insufficiency, but also can effectively avoid an attack from outside of a network, and hide and protect a computer in a private network.

A basic working principle of NAT is as follows: When a device on a private network side (private network side device) and a device on a public network side (public network side device) communicate with each other through a NAT device, the NAT device translates a source IP address or a destination IP address of a packet between a private network IP address and a public network IP address. When the private network side device sends a packet A to the public network side device, and packet A passes through the NAT device, the NAT device translates a private network IP address of packet A into a public network IP address, and sends packet A to the public network. When arriving at the public network side device, packet A no longer includes information about the private network IP address. When the public network side device sends a packet B to the private network side device, a destination IP address of packet B is a public network IP address, and packet B is sent to the NAT device. The NAT device translates the destination IP address of packet B into a private network IP address, and then sends packet B to the corresponding private network side device.

Figure 2:
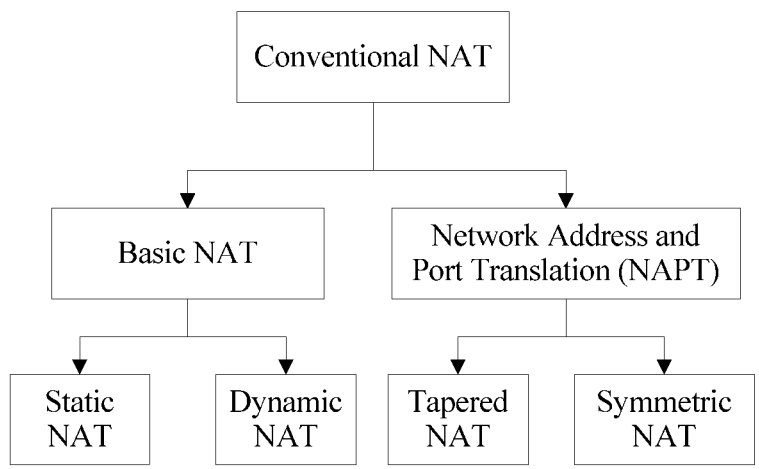
FIG. 2 is a schematic diagram of NAT classification.

NAT classification may be shown in FIG. 2. NAT in these embodiments is a type of NAPT (network address and port translation). The difference between NAPT and basic NAT is that NAPT is used for both IP address translation and port translation. In other words, an NAPT device is a NAT device translates an IP address and also translates a port.

VXLAN is a technology for encapsulating a layer 2 (data link layer) packet by using a layer 3 (network layer) protocol, and is an extension of a layer 2 network on a layer 3 network. The VXLAN provides the same Ethernet layer 2 service as a VLAN (virtual local area network). However, the VXLAN has better scalability and flexibility than the VLAN. The VLAN uses 12 bits to mark a VLAN ID and supports a maximum of 4094 ($2^{12}$) layer 2 network segments. The VXLAN uses 24 bits to mark a VNI (virtual network interface) or a VNID (virtual network ID), and supports 16777216 ($2^{24}$) layer 2 network segments.

Figure 3:
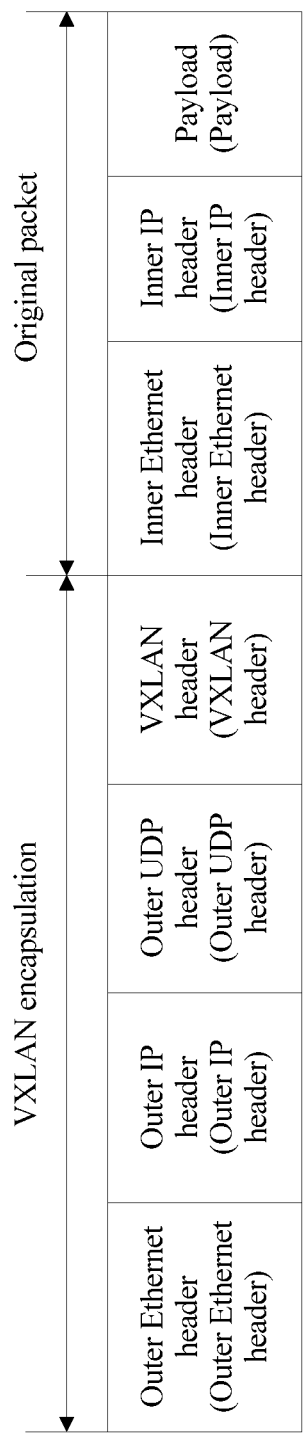
FIG. 3 is a schematic diagram of a VXLAN encapsulation format.

A VXLAN encapsulation format may be shown in FIG. 3. When no VXLAN encapsulation is performed on an original packet, the original packet includes an inner Ethernet header, an inner IP header, and a payload. When VXLAN encapsulation is performed on an original packet, a VXLAN header, an outer UDP (User Datagram Protocol) header, an outer IP header, and an outer Ethernet header are added ahead of the original packet. The VXLAN header includes a VXLAN identifier and a VNI. The outer UDP header includes a source port number, a destination port number, a UDP length, and a UDP checksum of an encapsulated packet. The outer IP header includes a source IP address and a destination IP address of the encapsulated packet.

As described above, a VTEP transmits a packet in the following processing manners:

(1) Packet receiving: the VTEP receives a VXLAN packet sent by a peer VTEP.

(2) Packet sending: when the VTEP sends a VXLAN packet, a source port number is randomly obtained or is obtained by using a hash algorithm, and a destination port number is a well-known port number 4789.

Based on the foregoing packet receiving processing manner and packet sending processing manner, if a VTEP located in a private network and a VTEP located in a public network communicate with each other through a NAT device, there is a problem where a packet is blocked or discarded.

Figure 1:
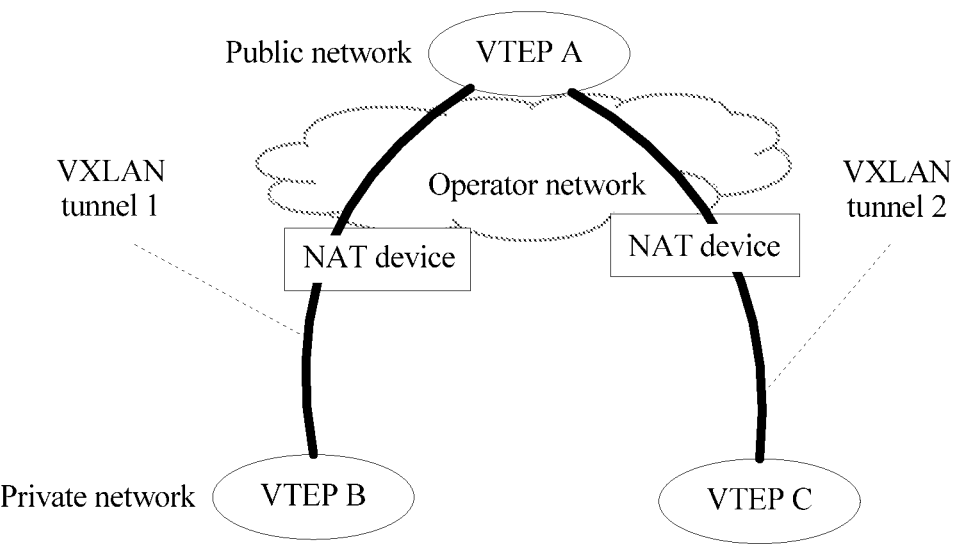
FIG. 1 is a schematic diagram showing how two VTEPs communicate with each other through a NAT device in the prior art.

A scenario in which a VTEP located in a private network and a VTEP located in a public network communicate with each other through a NAT device may be shown in FIG. 1. In FIG. 1, a VTEP A is located in the public network, and a VTEP B and a VTEP C are located in the private network. For example, VTEP B located in the private network and VTEP A located in the public network communicate with each other. If the foregoing packet transmission processing manners are used, a packet sent by VTEP B to VTEP A can be transmitted to VTEP A. However, when VTEP A sends a packet to VTEP B, because a destination port number of the packet is set to 4789, the destination port number of the packet cannot match a NAT entry of the NAT device. Consequently, the packet sent by VTEP A to VTEP B cannot be transmitted to VTEP B.

Figure 4:
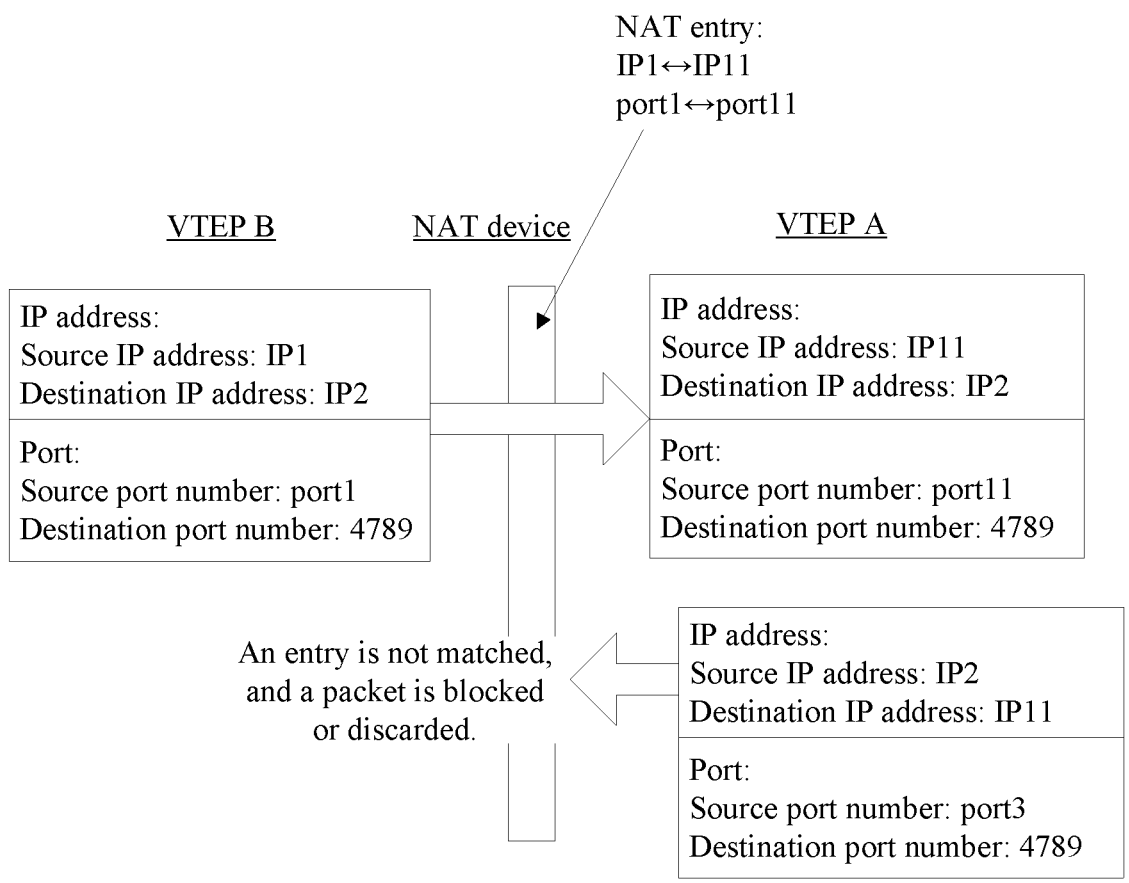
FIG. 4 is a schematic diagram showing two VTEPs communicating with each other through a NAT device.

As shown in FIG. 4, when VTEP B sends an encapsulated packet A to VTEP A, a source IP address of packet A is IP1, a destination IP address is IP2, a source port number is port1 (randomly obtained or obtained by using a hash algorithm), and a destination port number is 4789. IP1 is a private network IP address. When packet A passes through the NAT device, the NAT device translates the private network IP address (IP1) into a public network IP address (IP11) and translates the source port number corresponding to IP1 from port1 to port11. In this case, the NAT entry of the NAT device records a translation relationship: IP1 ↔ IP11 and port1 ↔ port11, and the NAT device sends packet A to VTEP A. When VTEP A sends an encapsulated packet B to VTEP B, the source IP address of packet B is IP2, the destination IP address is IP11, the source port number is port3 (randomly obtained or obtained by using a hash algorithm), and the destination port number is 4789. When packet B is sent to the NAT device, the NAT device searches the NAT entry, and can find no entry matching the destination port number 4789 of the packet B, and the source port number port3 also does not match the destination port number 4789 of packet A sent by VTEP B to VTEP A. Therefore, packet B is blocked or discarded in the NAT device.

This embodiment provides a packet transmission method and apparatus, to resolve the problem where a packet cannot traverse a NAT device when VTEPs communicate with each other through the NAT device. The method and the apparatus are based on the same concept. Because a problem-resolving principle of the method is similar to that of the apparatus, for similar details, mutually refer to implementation of the apparatus and that of the method. No repeated description is provided.

In addition, it should be understood that in the description of the embodiments, terms such as "first" and "second" are merely used for distinction description, and shall not be understood as an indication or implication of relative importance or an indication or implication of an order.

A packet transmission solution is described below with reference to the accompanying drawings.

Figure 5:
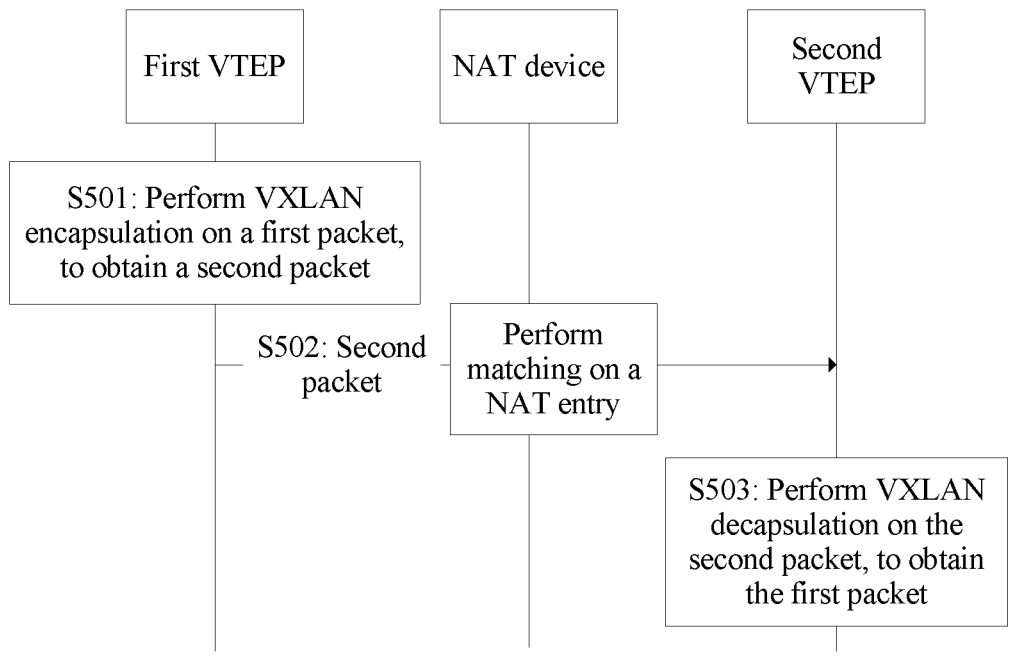
FIG. 5 is a schematic flowchart of a packet transmission method.

FIG. 5 is a schematic flowchart of a packet transmission method. The method is applied to a VXLAN, the VXLAN includes a first VTEP, a second VTEP, and a NAT device. The first VTEP communicates with the second VTEP through the NAT device, the first VTEP is located in a public network, and the second VTEP is located in a private network. The method includes the following steps.

In step S501, the first VTEP performs VXLAN encapsulation on a first packet, to obtain a second packet.

In step S502, the first VTEP sends the second packet to the second VTEP through the NAT device.

In this embodiment, the first VTEP is located in the public network, the second VTEP is located in the private network, and the first packet is a packet to be sent by the first VTEP. A destination port number of the second packet is obtained based on a destination IP address of the second packet, and a source port number of the second packet is a preset port number, for example, port number 4789.

It should be noted that, the preset port number in this embodiment may be 4789, or may be another specified port number. A specific value of the preset port number is not limited in this embodiment.

The first packet may be an original packet that is in a VXLAN encapsulation format shown in FIG. 3 and to which no VXLAN encapsulation is added, and the second packet may be a packet that is in the VXLAN encapsulation format shown in FIG. 3 and to which VXLAN encapsulation is added.

The first packet may be a response message sent by the first VTEP to the second VTEP after the second VTEP sends a request message to the first VTEP, or may be a message actively sent by the first VTEP to the second VTEP, for example, a notification message. The first packet includes information about a source MAC address and a destination MAC address of the first packet, and the source MAC address and the destination MAC address of the first packet are recorded in an inner Ethernet header of the first packet. The destination IP address of the second packet may be obtained based on the destination MAC address of the first packet.

The destination IP address of the second packet is recorded in an outer IP header, and the destination port number of the second packet and the source port number of the second packet are recorded in an outer UDP header.

It should be noted that, in this embodiment, the first VTEP and the second VTEP communicate with each other through the NAT device, and the NAT device translates a (destination/source) IP address and a (destination/source) port number of a packet. Therefore, a destination IP address and a destination port number of a packet sent by the first VTEP are different from those of the packet received by the second VTEP, and a source IP address and a source port number of a packet sent by the second VTEP are different from those of the packet received by the first VTEP.

For example, the first VTEP sends a packet C to the second VTEP, a destination IP address of packet C sent by the first VTEP is a public network IP address, a destination port number is a public network port number, and packet C is sent to the NAT device. After packet C is sent to the NAT device, the NAT device translates the destination IP address of packet C from the public network IP address to a private network IP address based on a NAT entry, translates the destination port number of the packet C from the public network port number to a private network port number based on the NAT entry, and then sends packet C to the second VTEP. In this case, the destination IP address of packet C received by the second VTEP is the private network IP address obtained through translation by the NAT device, and the destination port number is also the private network port number obtained through translation by the NAT device.

For another example, the second VTEP sends a packet D to the first VTEP, a source IP address of packet D sent by the second VTEP is a private network IP address, and a source port number is a private network port number. After packet D is sent to the NAT device, the NAT device translates the source IP address of packet D from the private network IP address to a public network IP address based on the NAT entry, translates the source port number of packet D from the private network port number to a public network port number based on the NAT entry, and then sends packet D to the first VTEP. In this case, the source IP address of packet D received by the first VTEP is the public network IP address obtained through translation by the NAT device, and the source port number is also the public network port number obtained through translation by the NAT device.

In this embodiment, the destination port number of the second packet needs to be obtained based on the destination IP address of the second packet. Before the destination port number of the second packet is obtained, the destination IP address of the second packet may be obtained by the following method: In step S501, before the first VTEP performs VXLAN encapsulation on the first packet, the first VTEP obtains the destination IP address of the second packet based on a destination MAC address of the first packet and a second mapping relationship, where the second mapping relationship is used to indicate a mapping relationship between a VXLAN-decapsulated source MAC address and a source IP address of a packet received by the first VTEP from the second VTEP through the NAT device.

After receiving the third packet, the first VTEP may generate or update the second mapping relationship based on a mapping relationship between a VXLAN-decapsulated source MAC address and a source IP address of the third packet.

It is assumed that the first VTEP receives a packet E from the private network. An encapsulation format of packet E may be shown in FIG. 3. The source IP address of packet E is recorded in an outer IP header of packet E, and the source MAC address that is of packet E and obtained after VXLAN decapsulation is recorded in an inner Ethernet header of packet E. The destination IP address of the second packet that is obtained based on the destination MAC address of the first packet and the second mapping relationship is the source IP address of the packet E received by the first VTEP. The source IP address is a public network IP address, and the public network IP address is used as the destination IP address of the second packet, so that the second packet can be sent to the NAT device, and then sent to the second VTEP in the private network by performing matching on the NAT entry.

The destination port number of the second packet is obtained based on the destination IP address of the second packet, and a manner for obtaining the destination port number of the second packet may be as follows: The first VTEP may obtain the destination port number of the second packet based on the destination IP address of the second packet and a first mapping relationship, where the first mapping relationship is used to indicate a mapping relationship between the source IP address and a source port number of the packet received by the first VTEP from the second VTEP through the NAT device.

It is assumed that the first VTEP receives a packet F from the private network, a source IP address of the received packet F is IP11, and a source port number is port11. Because packet F is a packet received by the first VTEP, IP11 is a public network IP address obtained through translation by the NAT device, and port11 is also a public network port number obtained through translation by the NAT device. In this case, when the first VTEP receives packet F, the NAT device has recorded a mapping relationship between a private network IP address IP1 and the public network IP address IP11, and a mapping relationship between a private network port number 4789 (preset port number) and the public network port number port11. When the first VTEP sends the second packet, after the second packet arrives at the NAT device, because the destination port number of the second packet is determined based on the destination IP address of the second packet (such as the source IP address IP11 of packet F), in other words, the destination port number of the second packet is port11, when the NAT device performs matching on the second packet based on the NAT entry, the destination port number port11 of the second packet successfully matches '4789↔port11' in the NAT entry, and the source IP address IP11 of the second packet successfully matches 'IP1↔IP11' in the NAT entry. Therefore, the NAT device may translate the destination IP address of the second packet from the public network IP address (IP11) to the private network IP address (IP1), and translate the destination port number of the second packet from the public network port number (port11) to the private network port number (4789), so as to send the second packet to the second VTEP.

The first mapping relationship may be generated or updated by the following method: in step S501, before the first VTEP performs VXLAN encapsulation on the first packet, the second VTEP may send a third packet to the first VTEP, and after receiving the third packet, the first VTEP may generate or update the first mapping relationship based on a mapping relationship between a source IP address and a source port number of the third packet.

The type of the third packet is not limited in this embodiment. Provided that the second VTEP sends a packet to the first VTEP through the NAT device, and a source port number and a destination port number of the packet are preset port numbers, the packet may be the third packet.

It should be noted that, in this embodiment, the first mapping relationship and the second mapping relationship may be generated, updated, and maintained by the first VTEP. There are a number of manners for generating or updating the first mapping relationship and the second mapping relationship. For example, the first VTEP may generate or update the first mapping relationship based on the mapping relationship between the source IP address and the source port number of the third packet, generate or update the first mapping relationship based on a mapping relationship between a source IP address and a source port number of a fourth packet, or generate or update the first mapping relationship based on a mapping relationship between a source IP address and a source port number of a detection packet. Likewise, the first VTEP may generate or update the second mapping relationship based on a packet such as the third packet, a fourth packet, or a detection packet. In addition, the operation of generating or updating the first mapping relationship and the second mapping relationship may alternatively be performed by an SDN controller. For example, the SDN controller receives a packet sent by the second VTEP, generates or updates the first mapping relationship and the second mapping relationship based on the packet, and then sends the generated or updated first mapping relationship and second mapping relationship to the first VTEP.

After the first VTEP generates or updates the first mapping relationship and the second mapping relationship, or after the first VTEP receives the first mapping relationship and the second mapping relationship that are sent by the SDN controller, the first VTEP may maintain the first mapping relationship and the second mapping relationship. To implement communication between the first VTEP and the second VTEP through the NAT device, the first VTEP needs to maintain the first mapping relationship and the second mapping relationship.

In step S503, the second VTEP performs VXLAN decapsulation on the received second packet, to obtain the first packet.

The first VTEP sends the second packet to the second VTEP through the NAT device, and the NAT device translates the destination IP address and the destination port number of the second packet based on the NAT entry of the NAT device, and then sends the second packet to the second VTEP. Therefore, the destination port number of the second packet received by the second VTEP is different from the destination port number of the second packet sent by the first VTEP, and the destination IP address of the second packet received by the second VTEP is different from the destination IP address of the second packet sent by the first VTEP. The destination port number of the second packet received by the second VTEP becomes the foregoing preset port number after being translated by the NAT device.

In VXLAN technology, after receiving a packet whose destination port number is a preset port number, a VTEP may determine that the packet is a VXLAN packet, and perform corresponding VXLAN packet processing on the packet, for example, perform processing such as VXLAN decapsulation. In this embodiment, the destination port number of the second packet sent by the first VTEP to the second VTEP is a port number determined based on the destination IP address of the second packet. However, when the second packet is sent to the NAT device, the NAT device translates the destination port number of the second packet based on the NAT entry, and then sends the second packet to the second VTEP. The translated destination port number of the second packet is the preset port number. Therefore, after the second VTEP receives the second packet, the destination port number of the second packet is the preset port number. In this case, the second VTEP determines that the second packet is a VXLAN packet, and performs VXLAN decapsulation on the second packet to obtain the first packet.

It should be noted that, the quantity of NAT devices through which the first VTEP and the second VTEP communicate with each other is not limited in this embodiment. Processing operations of the first VTEP and the second VTEP in a case in which the first VTEP and the second VTEP communicate with each other through a number of NAT devices are similar to those in a case in which the first VTEP and the second VTEP communicate with each other through one NAT device. Therefore, an example in which the first VTEP and the second VTEP communicate with each other through only one NAT device is used for description in this embodiment.

In the packet transmission method shown in FIG. 5, the first VTEP located in the public network sends the second packet to the second VTEP located in the private network, the destination port number of the second packet is obtained based on the destination IP address of the second packet, and the source port number is the preset port number. When the NAT device receives the second packet, because the source port number (preset port number) of the second packet can match a preset port number in the NAT entry, and the destination port number of the second packet is obtained based on the destination IP address of the second packet, the destination IP address of the second packet can match the NAT entry in the NAT device, and the destination port of the second packet can correspondingly match the NAT entry in the NAT device. Therefore, in the packet transmission method shown in FIG. 5, when the first VTEP and the second VTEP communicate with each other through the NAT device, a problem in the prior art where a packet cannot traverse a NAT device does not occur. In the packet transmission method shown in FIG. 5, the packet can be transmitted between the first VTEP located in the public network and the second VTEP located in the private network.

In addition, after the second packet sent by the first VTEP is translated by the NAT device, because the destination port number of the second packet is translated into the preset port number, the second VTEP may determine if the second packet is a VXLAN packet after receiving the translated second packet, and perform VXLAN decapsulation on the second packet to obtain the first packet.

The packet transmission method shown in FIG. 5 is based on a premise that the first VTEP and the second VTEP communicate with each other through the NAT device. Therefore, before step S501 is performed, there may be a number of manners to determine that the first VTEP and the second VTEP communicate with each other through the NAT device. Only two of the manners are listed by way of example below.

In the first manner:

The first VTEP determines that the first VTEP and the second VTEP communicate with each other through the NAT device. A method is as follows:

The second VTEP sends a detection packet to the first VTEP, where the detection packet carries detection information, and the detection information is used by the first VTEP to detect whether the first VTEP and the second VTEP communicate with each other through the NAT device. The first VTEP receives the detection packet sent by the second VTEP and determines, based on the detection information, that the first VTEP and the second VTEP communicate with each other through the NAT device.

Both a source port number and a destination port number of the detection packet are preset port numbers. The detection information includes one or more of the following information: a private network source IP address of the detection packet, a private network source port number of the detection packet, and a first calculation result obtained through calculation based on the private network source IP address and the private network source port number.

In addition, the detection packet may further carry a second identifier. The second identifier may be used to indicate that the detection packet is a packet used by the first VTEP to detect whether the first VTEP and the second VTEP communicate with each other through the NAT device. In this case, after receiving the detection packet, the first VTEP may determine, based on the second identifier, that the detection packet is the packet used by the first VTEP to detect whether the first VTEP and the second VTEP communicate with each other through the NAT device. Therefore, the first VTEP does not process a payload in the detection packet, and needs only to determine whether the first VTEP and the second VTEP communicate with each other through the NAT device. The detection packet carries the second identifier, so that system resource occupation caused because the second VTEP performs useless processing on the payload in the detection packet can be avoided.

Figure 6:
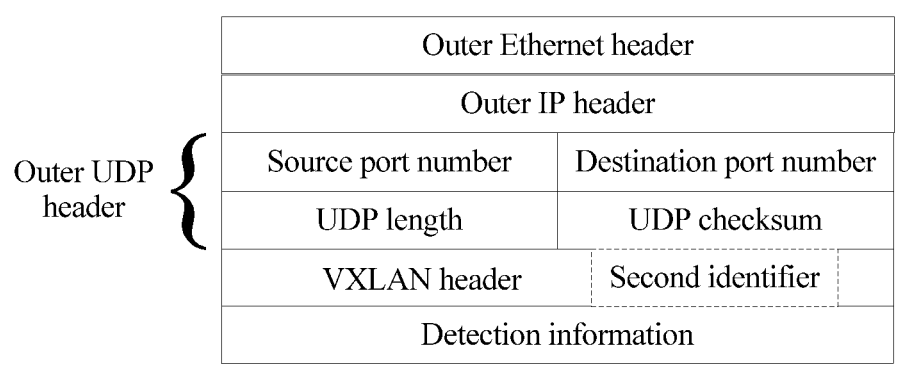
FIG. 6 is a schematic structural diagram of a detection packet.

An encapsulation format of the detection packet may be shown in FIG. 6. In FIG. 6, the second identifier is carried in a VXLAN header of the detection packet, and the detection information may be carried after the VXLAN header. It should be noted that, a specific part that is of the detection packet and in which the detection information is carried is not limited in this embodiment. For example, the detection information may be carried in the VXLAN header of the detection packet, or may be carried after the VXLAN header.

Based on different information included in the detection information, the manner in which the first VTEP determines, based on the detection information, that the first VTEP and the second VTEP communicate with each other through the NAT device is also different.

For example, when the detection information includes the private network source IP address of the detection packet, and the first VTEP determines, through comparison, that the private network source IP address of the detection packet is different from a source IP address of the detection packet, the first VTEP determines that the first VTEP and the second VTEP communicate with each other through the NAT device. This is because if the first VTEP and the second VTEP communicate with each other through the NAT device, the NAT device translates the private network source IP address of the detection packet into a public network IP address. The first VTEP compares the private network source IP address of the detection packet with the source IP address of the detection packet. If the private network source IP address of the detection packet is different from the source IP address of the detection packet, it indicates that the source IP address of the detection packet is the public network IP address obtained through translation by the NAT device, in other words, indicates that the first VTEP and the second VTEP communicate with each other through the NAT device.

For example, when the detection information includes the private network source port number of the detection packet, and the first VTEP determines, through comparison, that the private network source port number of the detection packet is different from a source port number of the detection packet, the first VTEP determines that the first VTEP and the second VTEP communicate with each other through the NAT device. This is because if the first VTEP and the second VTEP communicate with each other through the NAT device, the NAT device translates the private network source port number of the detection packet into a public network port number. The first VTEP compares the private network source port number of the detection packet with the source port number of the detection packet. If the private network source port number of the detection packet is different from the source port number of the detection packet, it indicates that the source port number of the detection packet is the public network port number obtained through translation by the NAT device, in other words, indicates that the first VTEP and the second VTEP communicate with each other through the NAT device.

For example, when the detection information includes the first calculation result obtained through calculation based on the private network source IP address and the private network source port number, the first VTEP calculates the source IP address of the detection packet and the source port number of the detection packet to obtain a second calculation result. When the second calculation result is different from the first calculation result, the first VTEP determines that the first VTEP and the second VTEP communicate with each other through the NAT device. This is because if the first VTEP and the second VTEP communicate with each other through the NAT device, the NAT device translates the private network source IP address of the detection packet into the public network IP address, and translates the private network source port number of the detection packet into the public network port number. The first VTEP calculates the source IP address of the detection packet and the source port number of the detection packet to obtain the second calculation result. If the second calculation result is different from the first calculation result in the detection information, it indicates that the private network source IP address of the detection packet is the public network IP address obtained through translation by the NAT device, and the private network source port number of the detection packet is the public network port number obtained through translation by the NAT device, in other words, indicates that the first VTEP and the second VTEP communicate with each other through the NAT device.

It should be noted that, the foregoing three cases listed by way of example may be implemented alone or in combination.

In addition to being used by the first VTEP to determine that the first VTEP and the second VTEP communicate with each other through the NAT device, the detection packet may be further used by the first VTEP to generate or update the first mapping relationship and the second mapping relationship. In other words, if the first mapping relationship is not generated when the first VTEP receives the detection packet, the first VTEP may generate the first mapping relationship based on a correspondence between the source IP address and the source port number of the detection packet. If the second mapping relationship is not generated when the first VTEP receives the detection packet, the first VTEP may generate the second mapping relationship based on a mapping relationship between a VXLAN-decapsulated source MAC address and the source IP address of the detection packet. If the first mapping relationship and the second mapping relationship have been generated when the first VTEP receives the detection packet, the first VTEP may update the first mapping relationship and the second mapping relationship based on the detection packet.

In the second manner:

The SDN controller determines that the first VTEP and the second VTEP communicate with each other through the NAT device. Control protocols between the SDN controller and the first VTEP or the second VTEP include NETCONF, OpenFlow, and the like. Based on the foregoing control protocols, the SDN controller may communicate with the first VTEP or the second VTEP. The manner in which the SDN controller determines that the first VTEP and the second VTEP communicate with each other through the NAT device may be shown in FIG. 7.

Figure 7:
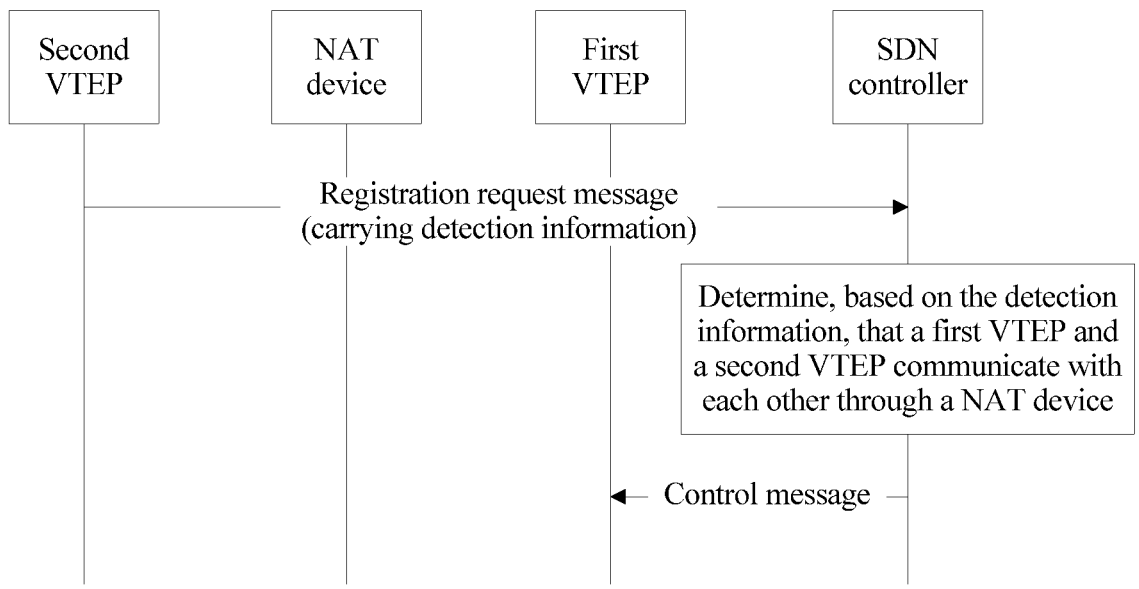
FIG. 7 is a schematic flowchart of determining that a first VTEP and a second VTEP traverse a NAT device.

In FIG. 7, the second VTEP sends a registration request message to the SDN controller. The registration request message carries detection information, and the detection information is used by the SDN controller to detect whether the first VTEP and the second VTEP communicate with each other through the NAT device. After receiving the registration request message, the SDN controller determines, based on the detection information carried in the registration request message, that the first VTEP and the second VTEP communicate with each other through the NAT device. Then, the SDN controller sends a control message to the first VTEP, and the control message is used to indicate that the first VTEP and the second VTEP communicate with each other through the NAT device.

The detection information includes one or more of the following information: a private network source IP address of the detection packet, a private network source port number of the detection packet, and a first calculation result obtained through calculation based on the private network source IP address and the private network source port number.

Based on different information included in the detection information, the manner in which the SDN controller determines, based on the detection information, that the first VTEP and the second VTEP communicate with each other through the NAT device is also different. The manner in which the SDN controller determines, based on the detection information, that the first VTEP and the second VTEP communicate with each other through the NAT device is similar to the manner in which the first VTEP determines that the first VTEP and the second VTEP communicate with each other through the NAT device in the foregoing first manner. Details are not described herein again.

If the first VTEP and the second VTEP do not communicate with each other through the NAT device, the first VTEP and the second VTEP may communicate with each other by using a packet transmission method, as provided in the prior art. After it is determined, in the foregoing first manner or second manner, that the first VTEP and the second VTEP communicate with each other through the NAT device, the working mode of the first VTEP and the second VTEP may be switched, and the working mode obtained after switching is referred to as a "NAT traversal mode". After being switched to the working mode, the first VTEP and the second VTEP perform the packet transmission method shown in FIG. 5, so that the first VTEP and the second VTEP may communicate with each other through the NAT device. If the foregoing second manner is used to determine that the first VTEP and the second VTEP communicate with each other through the NAT device, the SDN controller may instruct the first VTEP and the second VTEP to perform a working mode switching operation.

In the NAT device, the NAT entry has an aging cycle. In other words, if the NAT device does not receive, within a specific time, a packet matching the NAT entry, the NAT entry becomes invalid. Therefore, the second VTEP may send a fourth packet to the first VTEP through the NAT device. The fourth packet may be used by the NAT device to generate or update the NAT entry of the NAT device, and both a source port number and a destination port number of the fourth packet are preset port numbers. To avoid NAT entry invalidation, the second VTEP may periodically send the fourth packet, and a sending cycle may be shorter than the aging cycle of the NAT entry.

When receiving the fourth packet sent by the second VTEP, the NAT device refreshes the NAT entry. If an entry corresponding to a source IP address and the source port number of the fourth packet does not exist, the NAT device generates the entry; or if an entry corresponding to a source IP address and the source port number of the fourth packet exists, the NAT device updates an aging time of the entry.

In addition, the fourth packet may be used by the NAT device to update the NAT entry of the NAT device, and the fourth packet may be further used by the first VTEP to generate or update the first mapping relationship and the second mapping relationship. In other words, if the first mapping relationship is not generated when the first VTEP receives the fourth packet, the first VTEP may generate the first mapping relationship based on a mapping relationship between the source IP address and the source port number of the fourth packet. If the second mapping relationship is not generated when the first VTEP receives the fourth packet, the first VTEP may generate the second mapping relationship based on a mapping relationship between a VXLAN-decapsulated source MAC address and the source IP address of the fourth packet. If the first mapping relationship and the second mapping relationship have been generated when the first VTEP receives the fourth packet, the first VTEP may update the first mapping relationship and the second mapping relationship based on the fourth packet.

In addition, the fourth packet may carry a first identifier, and the first identifier may be used to indicate that the fourth packet is a packet used to generate or update the NAT entry. In this case, after receiving the fourth packet, the first VTEP may determine, based on the first identifier, that the fourth packet is the packet used to generate or update the NAT entry. Therefore, no processing is performed on a payload in the fourth packet, thereby avoiding system resource occupation.

Figure 8:
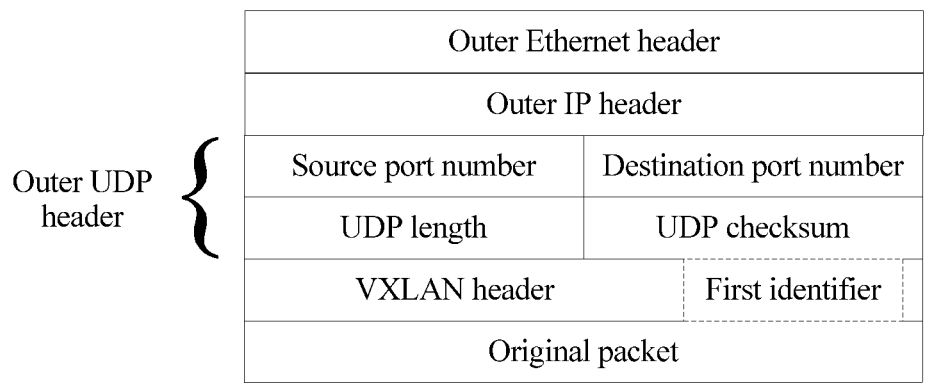
FIG. 8 is a schematic structural diagram of a packet.

Based on the foregoing description, a packet format of the fourth packet may be shown in FIG. 8. In FIG. 8, the first identifier may be carried in a VXLAN header of the fourth packet.

It should be noted that, an occasion for sending the fourth packet by the second VTEP is not limited in this embodiment. For example, the second VTEP may send the fourth packet before performing step S503, or may send the fourth packet after performing step S503. Alternatively, the second VTEP may send the fourth packet before the first VTEP performs step S501.

In addition, an embodiment further provides a packet transmission method. The method is applied to a VXLAN. The VXLAN includes a first VTEP, a second VTEP, and a NAT device. The first VTEP communicates with the second VTEP through the NAT device, the first VTEP is located in a public network, and the second VTEP is located in a private network. The method is shown in FIG. 9.

In step S901, the second VTEP performs VXLAN encapsulation on a fifth packet, to obtain a fourth packet.

The fifth packet is an original packet to be sent by the second VTEP. Both a source port number and a destination port number of the fourth packet are preset port numbers. The fourth packet is used by the NAT device to generate or update a NAT entry of the NAT device, and is used by the first VTEP to generate or update a mapping relationship. When the first VTEP sends a VXLAN-encapsulated packet to the second VTEP through the NAT device, the mapping relationship is used by the first VTEP to determine a destination port number and/or a destination IP address of the packet.

Figure 9:
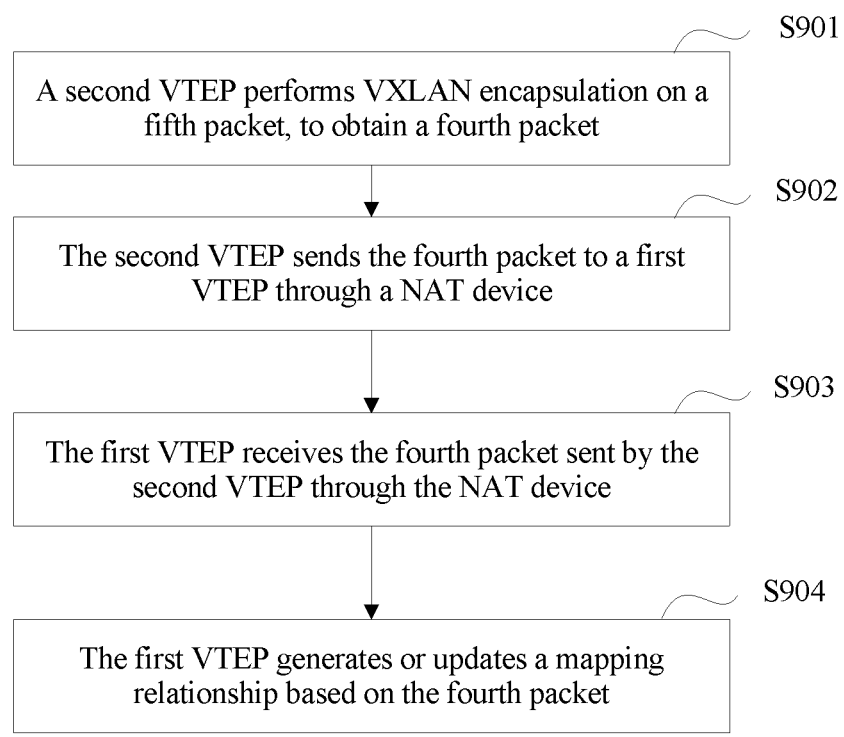
FIG. 9 is a schematic flowchart of a packet transmission method.

It should be noted that, the mapping relationship in the method shown in FIG. 9 may be the first mapping relationship and/or the second mapping relationship in the method shown in FIG. 5. When sending a packet to the second VTEP through the NAT device, the first VTEP may determine a destination IP address of the packet based on a destination MAC address of the packet and the second mapping relationship, and may determine a destination port number of the packet based on the destination IP address of the packet and the first mapping relationship.

It should also be noted that the VXLAN-encapsulated packet is a packet on which VXLAN encapsulation is performed. For example, all of a second packet, a third packet, the fourth packet, a detection packet, and the like are VXLAN-encapsulated packets. An encapsulation format of the VXLAN-encapsulated packet may be shown in FIG. 3. A first packet and the fifth packet in an embodiment are packets on which no VXLAN encapsulation is performed, namely, an original packet in FIG. 3. The second packet obtained after VXLAN encapsulation is performed on the first packet (VXLAN encapsulation shown in FIG. 3 is added ahead of the first packet) is a VXLAN-encapsulated packet, and the fourth packet obtained after VXLAN encapsulation is performed on the fifth packet (VXLAN encapsulation shown in FIG. 3 is added ahead of the fifth packet) is also a VXLAN-encapsulated packet.

In step S902, the second VTEP sends the fourth packet to the first VTEP through the NAT device.

In step S903, the first VTEP receives the fourth packet sent by the second VTEP through the NAT device.

In step S904, the first VTEP generates or updates the mapping relationship based on the fourth packet.

In the NAT device, the NAT entry has an aging cycle. In other words, if the NAT device does not receive, within a specific time, a packet matching the NAT entry, the NAT entry becomes invalid. Therefore, in this embodiment, the second VTEP may send the fourth packet to the first VTEP through the NAT device. The fourth packet may be used by the NAT device to update the NAT entry of the NAT device, and both the source port number and the destination port number of the fourth packet are the preset port numbers. To avoid NAT entry invalidation, the second VTEP may periodically send the fourth packet, and a sending cycle may be shorter than the aging cycle of the NAT entry.

When receiving the fourth packet sent by the second VTEP, the NAT device refreshes the NAT entry. If an entry corresponding to a source IP address and the source port number of the fourth packet does not exist, the NAT device creates the entry; or if an entry corresponding to a source IP address and the source port number of the fourth packet exists, the NAT device updates an aging time of the entry.

Optionally, after the first VTEP generates or updates the mapping relationship based on the fourth packet, the first VTEP may send a second packet to the second VTEP through the NAT device. A destination port number of the second packet is obtained based on the mapping relationship, and a source port number of the second packet is a preset port number.

In the foregoing manner, after the first VTEP receives the fourth packet, and generates or updates the mapping relationship based on the fourth packet, the first VTEP may send the second packet to the second VTEP.

Invalidation of the NAT entry of the NAT device can be avoided by performing the method shown in FIG. 9.

Figure 10:
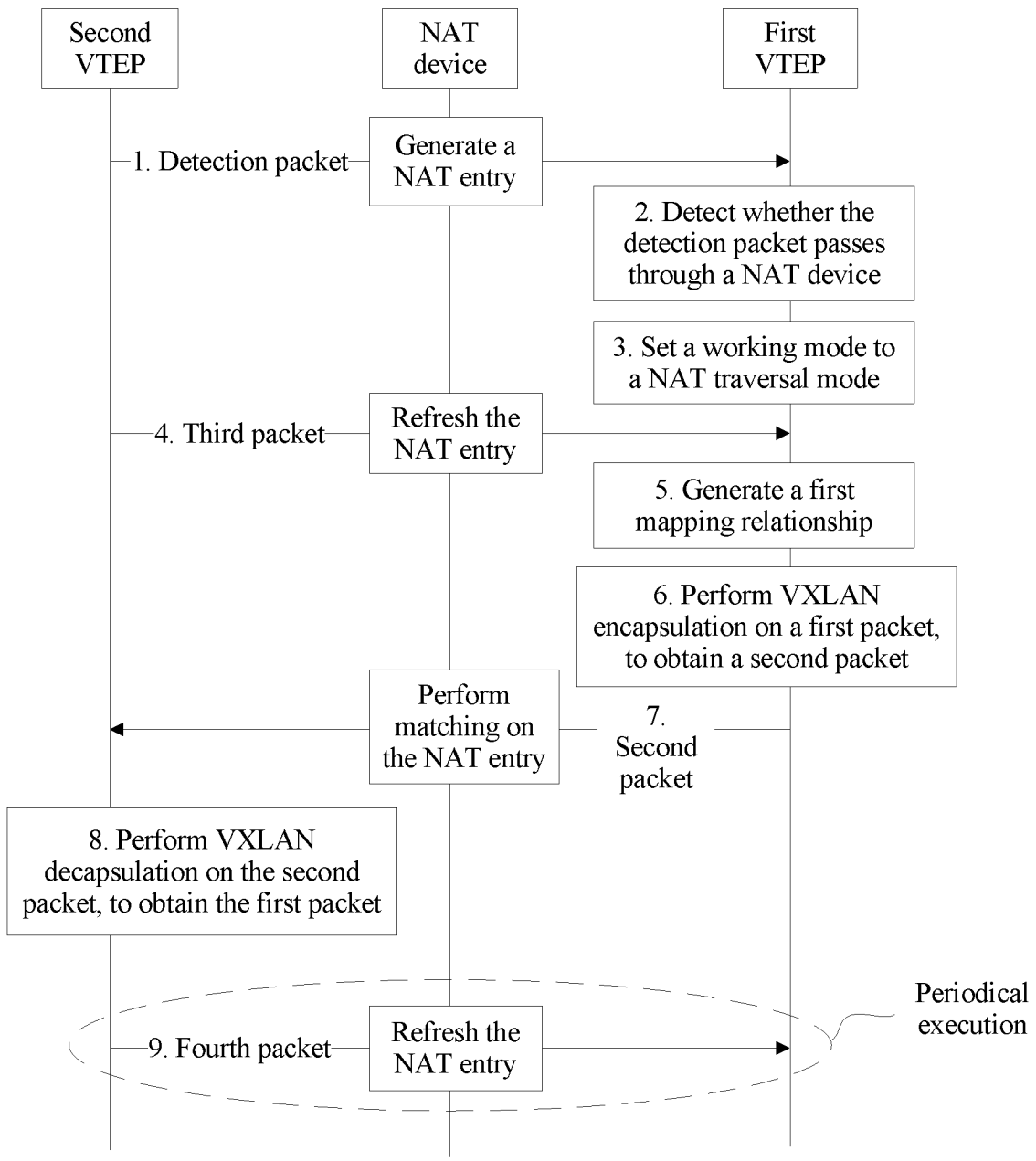
FIG. 10 is a schematic flowchart of a packet transmission method.

Based on the foregoing embodiments, a packet transmission method is provided. The packet transmission method may be considered as an example of the method shown in FIG. 5. As shown in FIG. 10, the method includes the following steps.

In step 1, a second VTEP sends a detection packet to a first VTEP through a NAT device.

The detection packet is used by the first VTEP to detect whether the detection packet traverses the NAT device when the second VTEP sends the detection packet to the first VTEP, and the detection packet carries detection information. If the detection packet traverses the NAT device, it indicates that the NAT device is deployed on a public network side, and the first VTEP and the second VTEP communicate with each other through the NAT device.

Both a source port number and a destination port number of the detection packet are 4789, a source IP address is IP1, and a destination IP address is IP2.

In step 2, the first VTEP detects whether the detection packet traverses the NAT device.

The first VTEP may detect, based on the detection information in the detection packet, whether the detection packet traverses the NAT device. For an exemplary detection method, refer to related descriptions in FIG. 5.

In step 3, after determining that the detection packet traverses the NAT device, the first VTEP sets a working mode to a NAT traversal mode.

After the detection packet traverses the NAT device, the NAT device translates the source IP address of the detection packet from IP1 to IP11 and translates the source port number of the detection packet from 4789 to port11. After receiving the detection packet, the first VTEP determines, through comparison, that IP11 is different from IP1 in the detection information, or determines, through comparison, that port11 is different from 4789 in the detection information, or determines, through comparison, that a second calculation result obtained through calculation based on IP11 and port11 is different from a first calculation result (obtained through calculation based on IP1 and 4789) in the detection information, so as to determine that the detection packet traverses the NAT device.

When the NAT device sends the detection packet to the first VTEP, a NAT entry of the NAT device records a translation relationship: IP1 ↔IP11 and 4789↔port11, and the translation relationship is the NAT entry.

After determining that the detection packet traverses the NAT device, the first VTEP sets the working mode to the NAT traversal mode.

In step 4, the second VTEP sends a third packet to the first VTEP through the NAT device.

Both a source port number and a destination port number of the third packet are 4789, a source IP address of the third packet is IP1, and a destination IP address is IP2.

When the third packet traverses the NAT device, based on the NAT entry, the NAT device translates the source IP address IP1 of the third packet into IP11, translates the source port number 4789 of the third packet into port11, and refreshes the NAT entry of the NAT device.

In step 5, the first VTEP generates a first mapping relationship based on a mapping relationship between a source IP address and a source port number of the received third packet.

The first mapping relationship is used to indicate a mapping relationship between IP11 and port11.

In step 6, the first VTEP performs VXLAN encapsulation on a first packet, to obtain a second packet.

A source IP address of the second packet is IP2, a destination IP address is IP11, a destination port number, such as, port11, of the second packet is obtained based on a destination IP address IP11 of the second packet and the first mapping relationship, and a source port number of the second packet is 4789.

Optionally, the first VTEP may obtain the destination IP address of the second packet based on a destination MAC address of the first packet and a second mapping relationship, and the second mapping relationship is used to indicate a mapping relationship between a VXLAN-decapsulated source MAC address and a source IP address of a packet received by the first VTEP from the second VTEP through the NAT device.

In step 7, the first VTEP sends the second packet to the second VTEP through the NAT device.

When receiving the second packet, the NAT device translates the destination IP address IP11 of the second packet into IP1 by matching the NAT entry of the NAT device, and translates the destination port number port11 of the second packet into 4789 by matching the NAT entry of the NAT device, so as to send the translated second packet to the second VTEP in a private network.

In step 8, the second VTEP performs VXLAN decapsulation on the second packet, to obtain the first packet.

After receiving the second packet, the second VTEP determines, by identifying that the destination port number of the second packet is 4789, that the second packet is a packet of a VXLAN type and performs VXLAN decapsulation on the second packet to obtain the first packet.

In step 9, the second VTEP periodically sends a fourth packet to the first VTEP.

Both a source port number and a destination port number of the fourth packet are 4789, a source IP address is IP1, and a destination IP address is IP2. The fourth packet is used by the NAT device to refresh the NAT entry. After receiving the fourth packet, the NAT device refreshes the NAT entry (IP1↔IP11 and 4789↔port11), to prevent NAT entry invalidation.

In addition, after receiving the fourth packet, the first VTEP may update the first mapping relationship and the second mapping relationship based on the fourth packet.

The method shown in FIG. 10 may be considered as an example of the method shown in FIG. 5. For an implementation that is not described in detail in FIG. 10, refer to related descriptions in FIG. 5.

Figure 11:
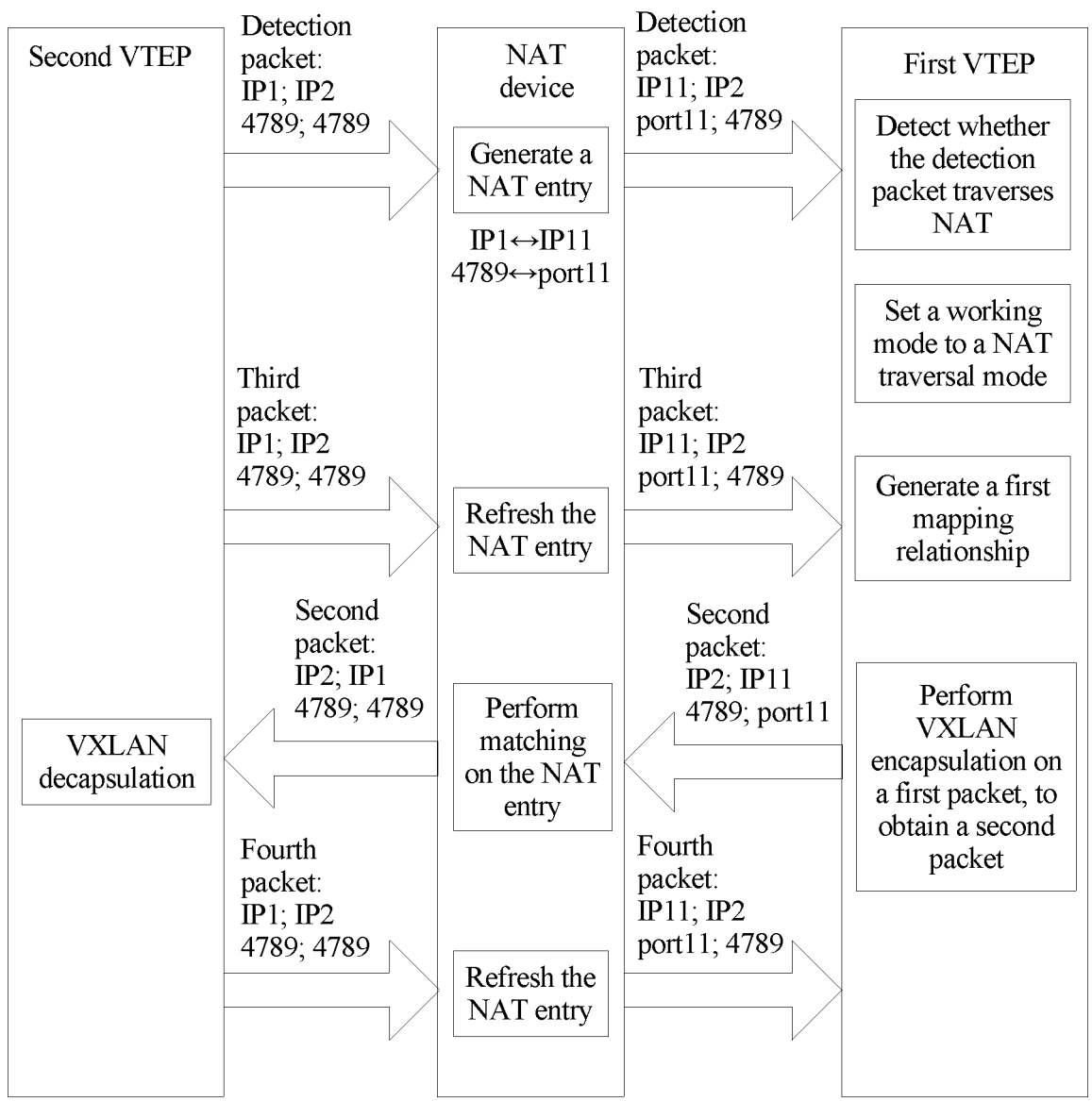
FIG. 11 is a schematic flowchart of a packet transmission method.

When packet transmission is performed by using the method shown in FIG. 10, FIG. 11 shows a change of a source IP address, a destination IP address, a source port number, and a destination port number of each packet from a time before the packet traverses the NAT device to a time after the packet traverses the NAT device. Referring to FIG. 11, an operation procedure of the method shown in FIG. 10 may be more easily understood.

In conclusion, in the packet transmission method provided in the embodiments, when the first VTEP and the second VTEP communicate with each other through the NAT device, a problem in the prior art where a packet cannot traverse a NAT device is resolved, and the packet is transmitted between the first VTEP in the public network and the second VTEP in the private network.

Figure 12:
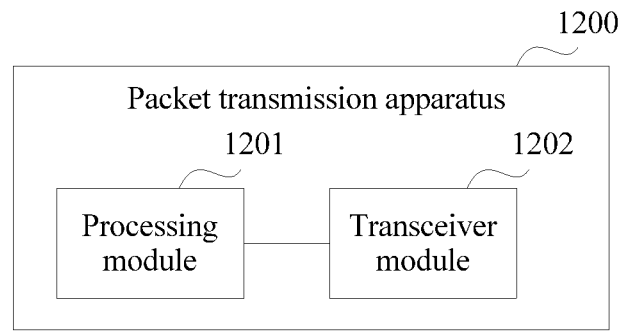
FIG. 12 is a schematic structural diagram of a packet transmission apparatus.

An embodiment provides a packet transmission apparatus, The apparatus is applied to a VXLAN. The VXLAN includes the apparatus, a second VTEP, and a NAT device. The apparatus communicates with the second VTEP through the NAT device. The apparatus is located in a public network, and the second VTEP is located in a private network. The apparatus may be configured to perform an operation performed by the first VTEP in the methods shown in FIG. 5, FIG. 7, FIG. 9, and FIG. 10, and the apparatus is located in the public network. Referring to FIG. 12, the packet transmission apparatus 1200 includes a processing module 1201 and a transceiver module 1202.

In the packet transmission apparatus 1200, the processing module 1201 is configured to perform VXLAN encapsulation on a first packet, to obtain a second packet, and the transceiver module 1202 is configured to send the second packet to the second VTEP through the NAT device. The second VTEP is located in the private network. The first packet is a to-be-sent packet, a destination port number of the second packet is obtained based on a destination IP address of the second packet, and a source port number of the second packet is a preset port number.

Optionally, the destination port number of the second packet is obtained based on the destination IP address of the second packet and a first mapping relationship, and the first mapping relationship is used to indicate a mapping relationship between a source IP address and a source port number of a packet received by the transceiver module 1202 from the second VTEP through the NAT device.

Optionally, the transceiver module 1202 is further configured to: before the processing module 1201 performs VXLAN encapsulation on the first packet, receive a third packet sent by the second VTEP through the NAT device. The processing module 1201 is further configured to generate or update the first mapping relationship based on a mapping relationship between a source IP address and a source port number of the third packet.

Optionally, the processing module 1201 is further configured to: before performing VXLAN encapsulation on the first packet, obtain the destination IP address of the second packet based on a destination MAC address of the first packet and a second mapping relationship. The second mapping relationship is used to indicate a mapping relationship between a VXLAN-decapsulated source MAC address and the source IP address of the packet received by the transceiver module 1202 from the second VTEP through the NAT device.

Optionally, the transceiver module 1202 is further configured to: before the processing module 1201 performs VXLAN encapsulation on the first packet, receive a detection packet sent by the second VTEP. The detection packet carries detection information, and the detection information is used to detect whether the apparatus and the second VTEP communicate with each other through the NAT device. The processing module 1201 is further configured to determine, based on the detection information, that the apparatus and the second VTEP communicate with each other through the NAT device.

The detection information includes one or more of the following information: a private network source IP address of the detection packet, a private network source port number of the detection packet, and a first calculation result obtained through calculation based on the private network source IP address and the private network source port number.

Optionally, when the processing module 1201 determines, based on the detection information, that the apparatus and the second VTEP communicate with each other through the NAT device, when determining, through comparison, that the private network source IP address of the detection packet is different from a source IP address of the detection packet, the processing module 1201 determines that the apparatus and the second VTEP communicate with each other through the NAT device; and/or when determining, through comparison, that the private network source port number of the detection packet is different from a source port number of the detection packet, the processing module 1201 determines that the apparatus and the second VTEP communicate with each other through the NAT device; and/or the processing module 1201 calculates the source IP address of the detection packet and the source port number of the detection packet to obtain a second calculation result, and when the second calculation result is different from the first calculation result, determines that the apparatus and the second VTEP communicate with each other through the NAT device.

Optionally, the transceiver module 1202 is further configured to: before the processing module 1201 performs VXLAN encapsulation on the first packet, receive a control message sent by an SDN controller. The control message is used to indicate that the apparatus and the second VTEP communicate with each other through the NAT device.

Optionally, the transceiver module 1202 is further configured to receive a fourth packet sent by the second VTEP through the NAT device. The fourth packet is used by the NAT device to generate or update a NAT entry of the NAT device.

Optionally, the fourth packet carries a first identifier, and the first identifier is used to indicate the packet type of the fourth packet.

It should be noted that, module division is an example, and is merely logical function division. There may be another division manner in actual implementation. Functional modules in the embodiments may be integrated into one processing module, or each of the modules may exist alone physically, or two or more modules may be integrated into one module. The integrated module may be implemented in a form of hardware or may be implemented in a form of a software functional module.

The packet transmission apparatus 1200 may be configured to perform the operation performed by the first VTEP in the packet transmission methods shown in FIG. 5, FIG. 7, FIG. 9, and FIG. 10. For an implementation that is not described in detail in the packet transmission apparatus 1200, refer to related descriptions in the packet transmission methods shown in FIG. 5, FIG. 7, FIG. 9, and FIG. 10.

Figure 13:
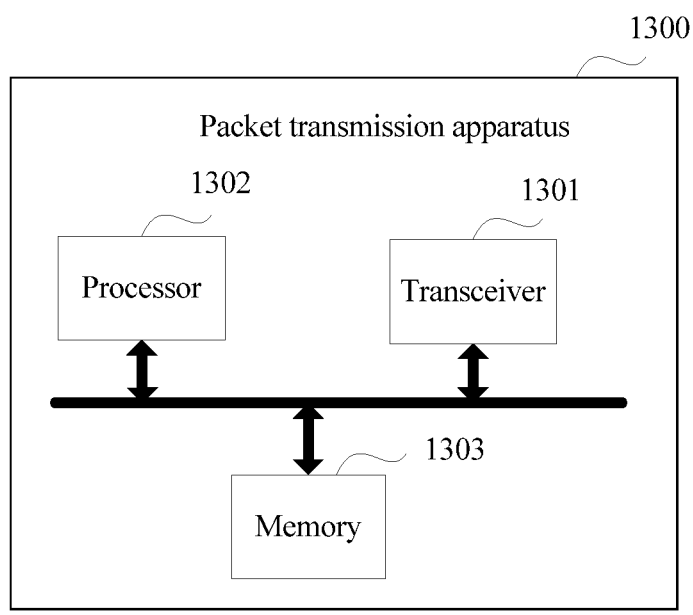
FIG. 13 is a schematic structural diagram of a packet transmission apparatus.

FIG. 13 is another possible schematic structural diagram of the packet transmission apparatus in the foregoing embodiment.

A packet transmission apparatus 1300 includes a transceiver 1301, a processor 1302, and a memory 1303. The transceiver 1301, the processor 1302, and the memory 1303 are connected by using a bus. The transceiver 1301 is configured to support the packet transmission apparatus 1300 in receiving and sending information with another apparatus (for example, a second VTEP). The processor 1302 performs, by invoking program code and data stored in the memory 1303, the packet transmission methods shown in FIG. 5, FIG. 7, FIG. 9, and FIG. 10.

The packet transmission apparatus 1300 may be the same apparatus as the packet transmission apparatus 1200. The packet transmission apparatus 1300 may be configured to perform an operation performed by the first VTEP in the packet transmission methods shown in FIG. 5, FIG. 7, FIG. 9, and FIG. 10. For an implementation that is not described in detail in the packet transmission apparatus 1300, refer to related descriptions in the packet transmission methods shown in FIG. 5, FIG. 7, FIG. 9, and FIG. 10, and the packet transmission apparatus 1200.

Figure 14:
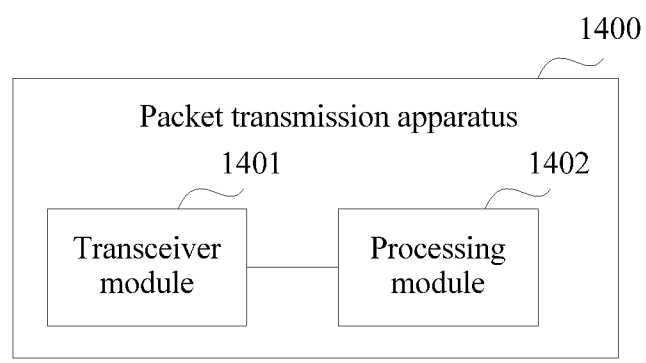
FIG. 14 is a schematic structural diagram of a packet transmission apparatus.

A packet transmission apparatus may be provided. The apparatus is applied to a VXLAN, the VXLAN includes a first VTEP, the apparatus, and a NAT device. The first VTEP communicates with the apparatus through the NAT device. The first VTEP is located in a public network, and the apparatus is located in a private network. The apparatus may be configured to perform an operation performed by the second VTEP in the methods shown in FIG. 5, FIG. 7, FIG. 9, and FIG. 10, and the apparatus is located in the private network. Referring to FIG. 14, the packet transmission apparatus 1400 includes a transceiver module 1401 and a processing module 1402.

In the packet transmission apparatus 1400, the transceiver module 1401 is configured to receive a second packet sent by the first VTEP through the NAT device. The first VTEP is located in the public network, both a source port number and a destination port number of the second packet are preset port numbers, and the destination port number of the second packet is obtained by the first VTEP based on a destination IP address of the second packet before the second packet is sent through the NAT device. The processing module 1402 is configured to perform VXLAN decapsulation on the second packet to obtain a first packet.

Optionally, the transceiver module 1401 is further configured to: before receiving the second packet sent by the first VTEP through the NAT device, send a third packet to the first VTEP through the NAT device. Both a source port number and a destination port number of the third packet are the preset port numbers, the third packet is used by the first VTEP to generate or update a first mapping relationship, and the first mapping relationship is used to indicate a mapping relationship between a source IP address and a source port number of a packet received by the first VTEP from the apparatus through the NAT device.

Optionally, the transceiver module 1401 is further configured to: before receiving the second packet sent by the first VTEP through the NAT device, send a detection packet to the first VTEP. The detection packet carries detection information. The detection information is used by the first VTEP to detect whether the first VTEP and the apparatus communicate with each other through the NAT device. Both a source port number and a destination port number of the detection packet are the preset port numbers The detection information includes one or more of the following information: a private network source IP address of the detection packet; a private network source port number of the detection packet; and a first calculation result obtained through calculation based on the private network source IP address and the private network source port number.

Optionally, the transceiver module 1401 is further configured to: before receiving the second packet sent by the first VTEP through the NAT device, send a registration request message to an SDN controller. The registration request message carries detection information, and the detection information is used by the SDN controller to detect whether the first VTEP and the apparatus communicate with each other through the NAT device.

The detection information includes one or more of the following information: a private network source IP address of the detection packet, a private network source port number of the detection packet, and a first calculation result obtained through calculation based on the private network source IP address and the private network source port number.

Optionally, the transceiver module 1401 is further configured to send a fourth packet to the first VTEP through the NAT device. The fourth packet is used by the NAT device to generate or update a NAT entry of the NAT device, and both a source port number and a destination port number of the fourth packet are the preset port numbers.

Optionally, the fourth packet carries a first identifier, and the first identifier is used to indicate a packet type of the fourth packet.

It should be noted that, the packet transmission apparatus 1400 may be configured to perform the operation performed by the second VTEP in the packet transmission methods shown in FIG. 5, FIG. 7, FIG. 9, and FIG. 10. For an implementation that is not described in detail in the packet transmission apparatus 1400, refer to related descriptions in the packet transmission methods shown in FIG. 5, FIG. 7, FIG. 9, and FIG. 10.

Figure 15:
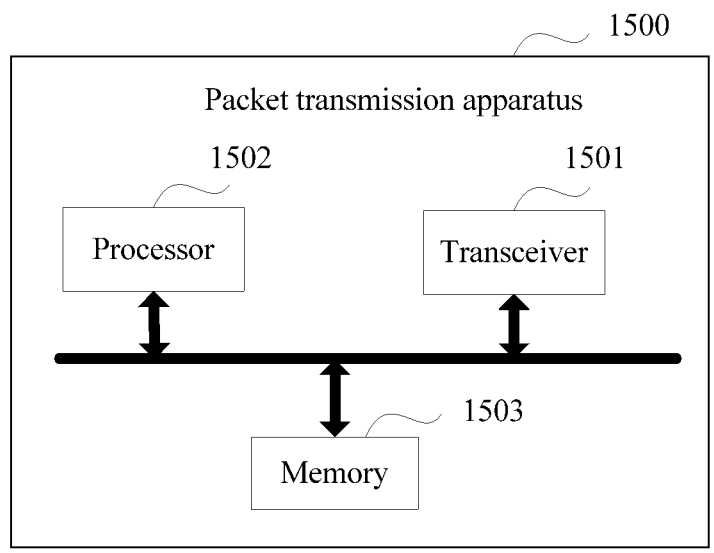
FIG. 15 is a schematic structural diagram of a packet transmission apparatus.

FIG. 15 is another possible schematic structural diagram of the packet transmission apparatus in the foregoing embodiment.

A packet transmission apparatus 1500 includes a transceiver 1501, a processor 1502, and a memory 1503. The transceiver 1501, the processor 1502, and the memory 1503 are connected by using a bus. The transceiver 1501 is configured to support the packet transmission apparatus 1500 in receiving and sending information with another apparatus (for example, a first VTEP). The processor 1502 performs, by invoking program code and data stored in the memory 1503, the packet transmission methods shown in FIG. 5, FIG. 7, FIG. 9, and FIG. 10.

The packet transmission apparatus 1500 may be the same apparatus as the packet transmission apparatus 1400. The packet transmission apparatus 1500 may be configured to perform an operation performed by the second VTEP in the packet transmission methods shown in FIG. 5, FIG. 7, FIG. 9, and FIG. 10. For an implementation that is not described in detail in the packet transmission apparatus 1500, refer to related descriptions in the packet transmission methods shown in FIG. 5, FIG. 7, FIG. 9, and FIG. 10, and the packet transmission apparatus 1400.

Figure 16:
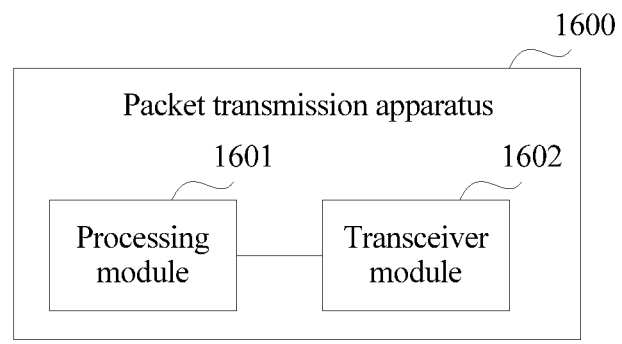
FIG. 16 is a schematic structural diagram of a packet transmission apparatus.

A packet transmission apparatus may be provided. The apparatus may be configured to perform an operation performed by the second VTEP in the method shown in FIG. 9, and the apparatus is located in a private network. Referring to FIG. 16, the packet transmission apparatus 1600 includes a processing module 1601 and a transceiver module 1602.

The processing module 1601 is configured to perform VXLAN encapsulation on a fifth packet, to obtain a fourth packet. The fifth packet is an original to-be-sent packet, both a source port number and a destination port number of the fourth packet are preset port numbers, the fourth packet is used by a NAT device to generate or update a NAT entry of the NAT device and is used by a first VTEP to generate or update a mapping relationship, and when the first VTEP sends a VXLAN-encapsulated packet to the apparatus through the NAT device, the mapping relationship is used by the first VTEP to determine a destination port number and/or a destination IP address of the packet. The transceiver module 1602 is configured to send the fourth packet to the first VTEP through the NAT device. The fourth packet is used by the NAT device to generate or update the NAT entry of the NAT device, and both the source port number and the destination port number of the fourth packet are the preset port numbers.

Optionally, when the transceiver module 1602 sends the fourth packet to the first VTEP through the NAT device, the transceiver module 1602 is periodically sends the fourth packet to the first VTEP through the NAT device.

It should be noted that, the packet transmission apparatus 1600 may be configured to perform an operation performed by the second VTEP in the packet transmission methods shown in FIG. 5, FIG. 7, FIG. 9, and FIG. 10. For an implementation that is not described in detail in the packet transmission apparatus 1600, refer to related descriptions in the packet transmission methods shown in FIG. 5, FIG. 7, FIG. 9, and FIG. 10.

Figure 17:
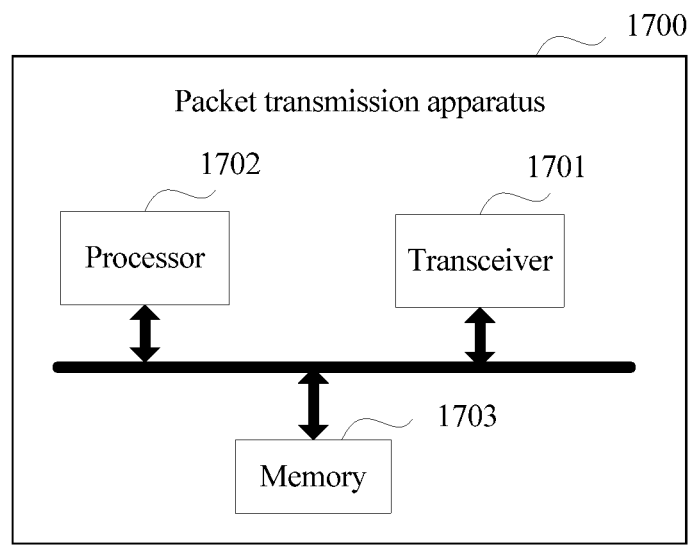
FIG. 17 is a schematic structural diagram of a packet transmission apparatus.

FIG. 17 is another possible schematic structural diagram of the packet transmission apparatus in the foregoing embodiment.

A packet transmission apparatus 1700 includes a transceiver 1701, a processor 1702, and a memory 1703. The transceiver 1701, the processor 1702, and the memory 1703 are connected by using a bus. The transceiver 1701 is configured to support the packet transmission apparatus 1700 in receiving and sending information with another apparatus (for example, a first VTEP). The processor 1702 performs a packet transmission method by invoking program code and data stored in the memory 1703.

The packet transmission apparatus 1700 may be the same apparatus as the packet transmission apparatus 1600. The packet transmission apparatus 1700 may be configured to perform an operation performed by the second VTEP in the packet transmission methods shown in FIG. 5, FIG. 7, FIG. 9, and FIG. 10. For an implementation that is not described in detail in the packet transmission apparatus 1700, refer to related descriptions in the packet transmission methods shown in FIG. 5, FIG. 7, FIG. 9, and FIG. 10, and the packet transmission apparatus 1600.

Figure 18:
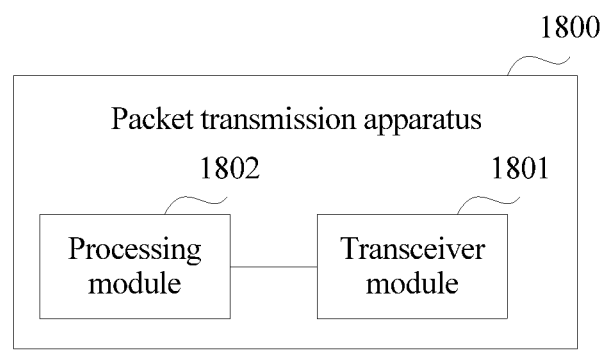
FIG. 18 is a schematic structural diagram of a packet transmission apparatus.

A packet transmission apparatus may be provided. The apparatus may be configured to perform an operation performed by the first VTEP in the methods shown in FIG. 5, FIG. 7, FIG. 9, and FIG. 10, and the apparatus is located in a public network. Referring to FIG. 18, the packet transmission apparatus 1800 includes a transceiver module 1801 and a processing module 1802.

The transceiver module 1801 is configured to receive a fourth packet sent by a second VTEP through a NAT device. The second VTEP is located in a private network. The fourth packet is used by the NAT device to generate or update a NAT entry of the NAT device and is used by the apparatus to generate or update a mapping relationship, and when the apparatus sends a VXLAN-encapsulated packet to the second VTEP through the NAT device, the mapping relationship is used by the apparatus to determine a destination port number and/or a destination IP address of the packet. The processing module 1802 is configured to generate or update the mapping relationship based on the fourth packet.

Optionally, when the transceiver module 1801 receives the fourth packet sent by the second VTEP through the NAT device, the transceiver module 1801 periodically receives the fourth packet sent by the second VTEP through the NAT device.

Optionally, after the processing module 1802 generates or updates the mapping relationship based on the fourth packet, the transceiver module 1801 sends a second packet to the second VTEP through the NAT device. A destination port number of the second packet is obtained based on the mapping relationship, and a source port number of the second packet is a preset port number.

It should be noted that, the packet transmission apparatus 1800 may be configured to perform the operation performed by the first VTEP in the packet transmission methods shown in FIG. 5, FIG. 7, FIG. 9, and FIG. 10. For an implementation that is not described in detail in the packet transmission apparatus 1800, refer to related descriptions in the packet transmission methods shown in FIG. 5, FIG. 7, FIG. 9, and FIG. 10.

Figure 19:
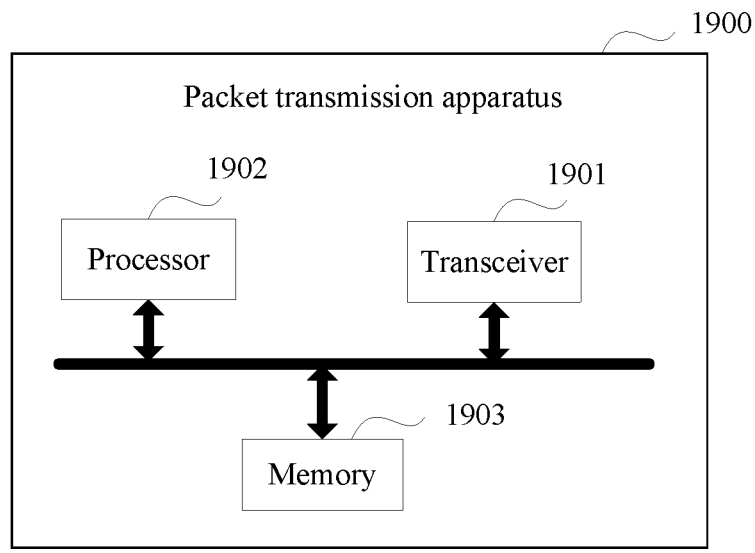
FIG. 19 is a schematic structural diagram of an packet transmission apparatus.

FIG. 19 is another possible schematic structural diagram of the packet transmission apparatus in the foregoing embodiment.

A packet transmission apparatus 1900 includes a transceiver 1901, a processor 1902, and a memory 1903. The transceiver 1901, the processor 1902, and the memory 1903 are connected by using a bus. The transceiver 1901 is configured to support the packet transmission apparatus 1900 in receiving and sending information with another apparatus (for example, a second VTEP). The processor 1902 performs a packet transmission method by invoking program code and data stored in the memory 1903.

The packet transmission apparatus 1900 may be the same apparatus as the packet transmission apparatus 1800. The packet transmission apparatus 1900 may be configured to perform an operation performed by the first VTEP in the packet transmission methods shown in FIG. 5, FIG. 7, FIG. 9, and FIG. 10. For an implementation that is not described in detail in the packet transmission apparatus 1900, refer to related descriptions in the packet transmission methods shown in FIG. 5, FIG. 7, FIG. 9, and FIG. 10, and the packet transmission apparatus 1800.

Figure 20:
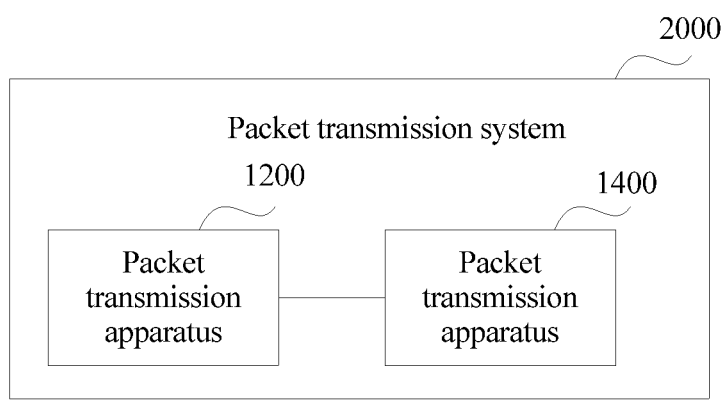
FIG. 20 is a schematic structural diagram of a packet transmission system.

In addition, a packet transmission system may be provided. As shown in FIG. 20, the packet transmission system 2000 includes the packet transmission apparatus 1200 shown in FIG. 12 or the packet transmission apparatus 1300, and the packet transmission apparatus 1400 shown in FIG. 14 or the packet transmission apparatus 1500. In FIG. 20, that the packet transmission system 2000 includes only the packet transmission apparatus 1200 and the packet transmission apparatus 1400 is used as an example.

Figure 21:
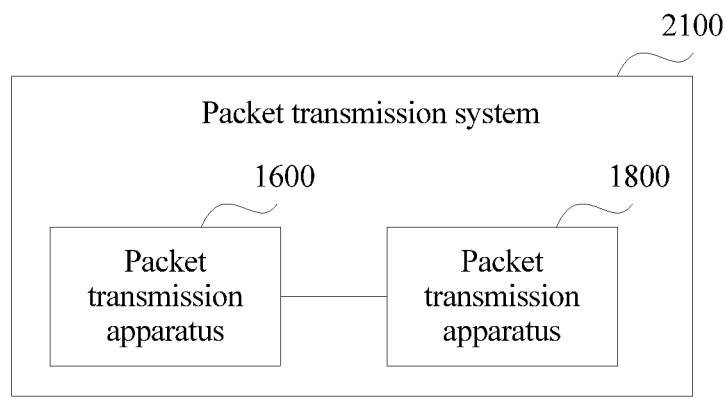
FIG. 21 is a schematic structural diagram of a packet transmission system.

In addition, an embodiment further provides a packet transmission system. As shown in FIG. 21, the packet transmission system 2100 includes the packet transmission apparatus 1600 shown in FIG. 16 or the packet transmission apparatus 1700, and the packet transmission apparatus 1800 shown in FIG. 18 or the packet transmission apparatus 1900. In FIG. 21, that the packet transmission system 2100 includes only the packet transmission apparatus 1600 and the packet transmission apparatus 1800 is used as an example.

A person of ordinary skill in the art understands that the embodiments may be provided as a method, a system, or a computer program product. Therefore, an embodiment may use a form of hardware only embodiments, software only embodiments, or embodiments with a combination of software and hardware. Moreover, the embodiments may use a form of a computer program product that is implemented on one or more computer-usable storage media (including but not limited to a magnetic disk memory, a CD-ROM, an optical memory, and the like) that include computer usable program code.

Embodiments are described with reference to the flowcharts and/or block diagrams of the method, the device (system), and the computer program product. Computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a function in one or more processes in the flowcharts and/or in one or more blocks in the block diagrams.

These computer program instructions may be loaded onto a computer or another programmable data processing device, so that a series of operations and steps are performed on the computer or the other programmable device, thereby generating computer-implemented processing. Therefore, the instructions executed on the computer or the other programmable device provide steps for implementing a function in one or more processes in the flowcharts and/or in one or more blocks in the block diagrams.

A person of ordinary skill in the art can make various modifications and variations to the embodiments without departing from the spirit and scope of the embodiments. The embodiments are intended to cover these modifications and variations of the embodiments provided that they fall within the scope of protection defined by the following claims and their equivalent technologies.

What is claimed is:

1. A packet transmission method, applied to a virtual extensible local area network (VXLAN), wherein the VXLAN comprises a first virtual extensible local area network tunnel end point (VTEP), a second VTEP, and a network address translation (NAT) device, the first VTEP communicates with the second VTEP through the NAT device, the first VTEP is located in a public network, the second VTEP is located in a private network, the method comprising:

performing, by the first VTEP, VXLAN encapsulation on a first packet, to obtain a second packet, and the second packet comprises a source port number and a destination port number, wherein the destination port number of the second packet is obtained based on at least one mapping relationship between a destination Internet Protocol (IP) address of the second packet and the destination port number, wherein the destination port number of the second packet is utilized for the VXLAN encapsulation, and the source port number of the second packet is a preset port number; and sending, by the first VTEP, the second packet to the second VTEP through the NAT device, wherein the destination port number of the second packet utilized for the VXLAN encapsulation is a port number of the second VTEP located in the private network, wherein the destination IP address of the second packet is an IP address of the second VTEP located in the private network, wherein the at least one mapping relationship includes a first mapping relationship, the destination port number of the second packet is obtained based on the destination IP address of the second packet and the first mapping relationship, and the first mapping relationship is used to indicate a mapping relationship between a source IP address and a source port number of at least one packet received by the first VTEP from the second VTEP through the NAT device, the at least one mapping relationship is generated and periodically updated by using the at least one packet received by the first VTEP from the second VTEP through the NAT device.

2. The method according to claim 1, further comprising, before the performing, by the first VTEP, of the VXLAN encapsulation on the first packet:

receiving, by the first VTEP, a third packet sent by the second VTEP through the NAT device; and generating or updating, by the first VTEP, the first mapping relationship based on a mapping relationship between a source IP address and a source port number of the third packet, wherein the at least one packet includes the third packet.

3. The method according to claim 1, further comprising, before the performing, by the first VTEP, of the VXLAN encapsulation on the first packet:

obtaining, by the first VTEP, the destination IP address of the second packet based on a destination MAC address of the first packet and a second mapping relationship, wherein the at least one mapping relationship includes the second mapping relationship, the second mapping relationship is used to indicate a mapping relationship between a VXLAN-decapsulated source MAC address and the source IP address of the at least one packet received by the first VTEP from the second VTEP through the NAT device.

4. The method according to claim 1, further comprising, before the performing, by the first VTEP, of the VXLAN encapsulation on the first packet:

receiving, by the first VTEP, a detection packet sent by the second VTEP, wherein the detection packet carries detection information, the detection information is used to detect whether the first VTEP and the second VTEP communicate with each other through the NAT device, and the detection information comprises one or more of the following information: a private network source IP address of the detection packet, a private network source port number of the detection packet, and a first calculation result obtained through calculation based on the private network source IP address and the private network source port number; and determining, by the first VTEP based on the detection information in one or more of the following manners, that the first VTEP and the second VTEP communicate with each other through the NAT device:

when determining, through comparison, that the private network source IP address of the detection packet is different from a source IP address of the detection packet, determining, by the first VTEP, that the first VTEP and the second VTEP communicate with each other through the NAT device;

when determining, through comparison, that the private network source port number of the detection packet is different from a source port number of the detection packet, determining, by the first VTEP, that the first VTEP and the second VTEP communicate with each other through the NAT device; and calculating, by the first VTEP, the source IP address of the detection packet and the source port number of the detection packet to obtain a second calculation result, and when the second calculation result is different from the first calculation result, determining that the first VTEP and the second VTEP communicate with each other through the NAT device.

5. The method according to claim 1, further comprising, before the performing, by the first VTEP, of the VXLAN encapsulation on the first packet:

receiving, by the first VTEP, a control message sent by a software-defined networking SDN controller, wherein the control message is used to indicate that the first VTEP and the second VTEP communicate with each other through the NAT device.

6. A packet transmission method, applied to a virtual extensible local area network VXLAN, wherein the VXLAN comprises a first virtual extensible local area network tunnel end point VTEP, a second VTEP, and a network address translation NAT device, the first VTEP communicates with the second VTEP through the NAT device, the first VTEP is located in a public network, the second VTEP is located in a private network, and the method comprises:

receiving, by the second VTEP, a second packet sent by the first VTEP through the NAT device, wherein the second packet comprises a source port number and a destination port number, the source port number of the second packet is a preset port number, and the destination port number of the second packet is obtained by the first VTEP based on at least one mapping relationship between a destination Internet Protocol (IP) address of the second packet and the destination port number, wherein the destination port number of the second packet is utilized for the VXLAN decapsulation before the second packet is sent through the NAT device; and performing, by the second VTEP, VXLAN decapsulation on the second packet, to obtain a first packet, wherein the destination port number of the second packet utilized for the VXLAN decapsulation is a port number of the second VTEP located in the private network, wherein the destination IP address of the second packet is an IP address of the second VTEP located in the private network, and further comprising, before the receiving, by the second VTEP, of the second packet sent by the first VTEP through the NAT device:

sending, by the second VTEP, a third packet to the first VTEP through the NAT device, wherein both a source port number and a destination port number of the third packet are the preset port numbers, the third packet is used by the first VTEP to generate or update a first mapping relationship, and the first mapping relationship is used to indicate a mapping relationship between a source IP address and a source port number of at least one packet received by the first VTEP from the second VTEP through the NAT device, wherein the at least one mapping relationship includes the first mapping relationship, wherein the at least one packet includes the third packet, and wherein the at least one mapping relationship is generated and periodically updated by using the at least one packet received by the first VTEP from the second VTEP through the NAT device.

7. The method according to claim 6, further comprising, before the receiving, by the second VTEP, of the second packet sent by the first VTEP through the NAT device:

sending, by the second VTEP, a detection packet to the first VTEP, wherein the detection packet carries detection information, the detection information is used by the first VTEP to detect whether the first VTEP and the second VTEP communicate with each other through the NAT device, and both a source port number and a destination port number of the detection packet are the preset port numbers; wherein the detection information comprises one or more of:

a private network source IP address of the detection packet;

a private network source port number of the detection packet; and a first calculation result obtained through calculation based on the private network source IP address and the private network source port number.

8. The method according to claim 7, further comprising, before the receiving, by the second VTEP, of the second packet sent by the first VTEP through the NAT device:

sending, by the second VTEP, a registration request message to a software-defined networking SDN controller, wherein the registration request message carries detection information, and the detection information is used by the SDN controller to detect whether the first VTEP and the second VTEP communicate with each other through the NAT device; wherein the detection information comprises one or more of:

a private network source IP address of the detection packet;

a private network source port number of the detection packet; and a first calculation result obtained through calculation based on the private network source IP address and the private network source port number.

9. The method according to claim 6, further comprising:

sending, by the second VTEP, a fourth packet to the first VTEP through the NAT device, wherein the fourth packet is used by the NAT device to generate or update a NAT entry of the NAT device, and both a source port number and a destination port number of the fourth packet are the preset port numbers.

10. The method according to claim 9, wherein the fourth packet carries a first identifier, and the first identifier is used to indicate a packet type of the fourth packet.

11. A packet transmission apparatus, applied to a virtual extensible local area network (VXLAN), wherein the VXLAN comprises the packet transmission apparatus, a second virtual extensible local area network tunnel end point (VTEP), and a network address translation (NAT) device, the apparatus communicates with the second VTEP through the NAT device, the apparatus is located in a public network, the second VTEP is located in a private network, and the apparatus comprises:

a processor, configured to perform VXLAN encapsulation on a first packet, to obtain a second packet, wherein the second packet comprises a source port number and a destination port number, the destination port number of the second packet is obtained based at least one mapping relationship between a destination Internet Protocol (IP) address of the second packet and the destination port number, wherein the destination port number is utilized for the VXLAN encapsulation, and the source port number of the second packet is a preset port number; and a transceiver configured to send the second packet to the second VTEP through the NAT device, wherein the destination port number utilized for the VXLAN encapsulation is a port number of the second VTEP located in the private network, wherein the destination IP address of the second packet is an IP address of the second VTEP located in the private network, wherein the at least one mapping relationship includes a first mapping relationship, the destination port number of the second packet is obtained based on the destination IP address of the second packet and the first mapping relationship, and the first mapping relationship is used to indicate a mapping relationship between a source IP address and a source port number of at least one packet received by the transceiver from the second VTEP through the NAT device, the at least one mapping relationship is generated and periodically updated by using the at least one packet received by the first VTEP from the second VTEP through the NAT device.

12. The apparatus according to claim 11, wherein the transceiver is further configured to:

before the processor performs VXLAN encapsulation on the first packet, receive a third packet sent by the second VTEP through the NAT device; and the processor is further configured to generate or update the first mapping relationship based on a mapping relationship between a source IP address and a source port number of the third packet, wherein the at least one packet includes the third packet.

13. The apparatus according to claim 11, wherein the processor is further configured to:

before performing VXLAN encapsulation on the first packet, obtain the destination IP address of the second packet based on a destination MAC address of the first packet and a second mapping relationship, wherein the at least one mapping relationship includes a second mapping relationship, the second mapping relationship is used to indicate a mapping relationship between a VXLAN-decapsulated source MAC address and the source IP address of the at least one packet received by the transceiver from the second VTEP through the NAT device.

14. The apparatus according to claim 11, wherein the transceiver is further configured to:

before the processor performs VXLAN encapsulation on the first packet, receive a detection packet sent by the second VTEP, wherein the detection packet carries detection information, the detection information is used to detect whether the apparatus and the second VTEP communicate with each other through the NAT device, and the detection information comprises one or more of the following information: a private network source IP address of the detection packet, a private network source port number of the detection packet, and a first calculation result obtained through calculation based on the private network source IP address and the private network source port number; and the processor is further configured to determine, based on the detection information in one or more of the following manners, that the apparatus and the second VTEP communicate with each other through the NAT device:

when determining, through comparison, that the private network source IP address of the detection packet is different from a source IP address of the detection packet, determining, by the processor, that the apparatus and the second VTEP communicate with each other through the NAT device;

when determining, through comparison, that the private network source port number of the detection packet is different from a source port number of the detection packet, determining, by the processor, that the apparatus and the second VTEP communicate with each other through the NAT device; and calculating, by the processor, the source IP address of the detection packet and the source port number of the detection packet to obtain a second calculation result, and when the second calculation result is different from the first calculation result, determining that the apparatus and the second VTEP communicate with each other through the NAT device.

15. The apparatus according to claim 11, wherein the transceiver is further configured to:

before the processor performs VXLAN encapsulation on the first packet, receive a control message sent by a software-defined networking SDN controller, wherein the control message is used to indicate that the apparatus and the second VTEP communicate with each other through the NAT device.

16. The apparatus according to claim 11, wherein the transceiver is further configured to:

receive a fourth packet sent by the second VTEP through the NAT device, wherein the fourth packet is used by the NAT device to generate or update a NAT entry of the NAT device.

17. The apparatus according to claim 16, wherein the fourth packet carries a first identifier, and the first identifier is used to indicate a packet type of the fourth packet.

* * * * *